United States Patent
Sekiya

(10) Patent No.: US 11,381,561 B2
(45) Date of Patent: Jul. 5, 2022

(54) OPERATION AUTHENTICATION RELAY APPARATUS, METHOD, AND PROGRAM

(71) Applicant: NEC Corporation, Tokyo (JP)

(72) Inventor: Kayato Sekiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 16/767,790

(22) PCT Filed: Dec. 1, 2017

(86) PCT No.: PCT/JP2017/043375
§ 371 (c)(1),
(2) Date: May 28, 2020

(87) PCT Pub. No.: WO2019/106849
PCT Pub. Date: Jun. 6, 2019

(65) Prior Publication Data
US 2020/0366679 A1   Nov. 19, 2020

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04L 9/40* | (2022.01) | |
| *G06F 21/31* | (2013.01) | |

(Continued)

(52) U.S. Cl.
CPC .......... *H04L 63/0884* (2013.01); *G06F 21/31* (2013.01); *G06F 21/554* (2013.01); *G06F 21/82* (2013.01)

(58) Field of Classification Search
CPC ... H04L 63/0884; G06F 21/31; G06F 21/554; G06F 21/82; G06F 21/32; G06F 21/34
See application file for complete search history.

(56) References Cited

U.S. PATENT DOCUMENTS

| | | | |
|---|---|---|---|
| 2012/0265988 A1* | 10/2012 | Ehrensvard | H04W 12/069 713/165 |
| 2016/0259940 A1* | 9/2016 | Wang | G06F 21/83 |
| 2018/0225230 A1* | 8/2018 | Litichever | G06F 21/82 |

FOREIGN PATENT DOCUMENTS

| | | |
|---|---|---|
| EP | 2629234 A2 | 8/2013 |
| JP | 2003-208402 A | 7/2003 |

(Continued)

OTHER PUBLICATIONS

Extended European Search Report for EP Application No. EP17933635.9 dated Oct. 8, 2020.

(Continued)

*Primary Examiner* — Amie C. Lin
(74) *Attorney, Agent, or Firm* — Sughrue Mion, PLLC

(57) ABSTRACT

A relay apparatus, which is connected between an information terminal and at least one peripheral device communicatively connected to the information terminal and supplying information to the information terminal, is recognized as a peripheral device by the information terminal, and recognized as an information terminal by the peripheral device. The relay apparatus comprises authentication means for authenticating a user using the information terminal by operating the peripheral device and control means for controlling relaying of an operation signal of the peripheral device operated by the user to the information terminal, based on an authentication result of the user.

20 Claims, 27 Drawing Sheets

(51) Int. Cl.
  *G06F 21/55* (2013.01)
  *G06F 21/82* (2013.01)

(56) References Cited

FOREIGN PATENT DOCUMENTS

| JP | 2005-310104 A | 11/2005 |
| JP | 2006-053780 A | 2/2006 |
| JP | 2008-197963 A | 8/2008 |
| JP | 2010-081767 A | 4/2010 |
| JP | 2010-117855 A | 5/2010 |
| WO | 2009/001447 A1 | 12/2008 |
| WO | 2017/046789 A1 | 3/2017 |

OTHER PUBLICATIONS

International Search Report for PCT Application No. PCT/JP2017/043375, dated Feb. 6, 2018.

* cited by examiner

161: REGISTRATION DATA

| ID | REGISTERED FACE IMAGE DATA (FACIAL FEATURES) | NAME | DEPT. | POSITION | ACCESS RIGHT |
|---|---|---|---|---|---|
| A |  | MARUMARU SANKAKU | FACILITY OPERATION | NOT IN CHARGE | BROWSING GROUP |
| B |  | KUROMARU SHIKAKU | FACILITY OPERATION | IN CHARGE | ADMINISTRATOR GROUP |
| C |  | NIJUMARU GOKAKU | FACILITY MAINTENANCE | IN CHARGE | ADMINISTRATOR GROUP |

171: AUTHENTICATION HISTORY

| AUTHENTICATED USER (ID) | AUTHENTICATION TIME INFORMATION (TIME PERIOD) | ACCESS RIGHT |
|---|---|---|
| B | 2017/10/10 11:17:30 — 16:20:41 | ADMINISTRATOR GROUP |
| C | 2017/10/10 13:18:01-17:19:51 | ADMINISTRATOR GROUP |
| ... | ... | ... |
| A | 2017/10:10 15:20:09-15:25:30 | BROWSING GROUP |

FIG.9C

181: OPERATION EVENT HISTORY

| LOG NUMBER | DATA EXCHANGED WITH USB HOST FUNCTION | DATA EXCHANGED WITH USB DEVICE FUNCTION | TIME INFORMATION | PROCESSING BY PASS/BLOCK CONTROL FUNCTION | OPERATION ON PERIPHERAL DEVICE |
|---|---|---|---|---|---|
| 1 | DATA$_1$ | DATA$_1$ | 2017/10/10 15:21:11 | PASS | |
| 2 | DATA$_2$ | DATA$_2$ | 2017/10/10 15:22:20 | PASS | |
| .... | ... | | | | |
| N | DATA$_N$ | | 2017/10:10 15:24:33 | BLOCK | NUMERIC VALUE + ENTER KEY (PARAMETER INPUT) |
| ... | ... | ... | ... | | |

OPERATION AUTHENTICATION RELAY APPARATUS, METHOD, AND PROGRAM

This application is a National Stage Entry of PCT/JP2017/043375 filed on Dec. 1, 2017, the contents of all of which are incorporated herein by reference, in their entirety.

FIELD

The present invention relates to an operation authentication relay apparatus, method, and program.

BACKGROUND

In recent years, openization has been progressing in operation monitoring systems which are installed in critical infrastructure facilities such as a central operation room in a power plant. One of examples of the openization is a progress of utilization of a system adopting a general-purpose information terminal(s) having a general-purpose operating system installed on general-purpose hardware and having dedicated monitoring software installed thereon, in place of a conventional dedicated monitoring apparatus. As for display, the openization is accompanied with replacement of a dedicated display apparatus by a general-purpose flat display panel. Further, in terms of operation equipment, a conventional dedicated physical operation panel has been replaced by GUI (Graphical User Interface) operation on an information terminal where an icon(s) displayed on a screen is operated using a keyboard or a pointing device such as a mouse.

In recent years, a risk of cyber attacks on critical infrastructure, which has been increasingly computerized, has been increasing. Some countries have introduced security regulations with penalties.

Therefore, with openization, it is urgent for the industry to take various security measures for operation monitoring systems.

Generally, unauthorized operation of an operation monitoring system by a person within an organization (insider) is regarded as a great risk. In order to restrict or prevent an unauthorized operation by an insider on an operation monitoring system, it is desirable to implement, for instance, the following functions with respect to a predetermined or arbitrary operation in an information terminal related to operation, maintenance, etc., of the operation monitoring system,
1) capable to identify a person who performed operation on the information terminal;
2) capable to grasp content of an operation on the information terminal performed by the person; and
3) capable to invalidate an operation that exceeds an authority range given to the person, or generate a warning for such an operation.

Generally, these functions are known as "access management functions" for the information terminal. The most widespread type of access management method authenticates a user by having the user enter a user name and secret password (user account).

There are many operation monitoring systems adopting an operation method in which one single shared user account (user ID and password shared by users) is used without preparing an individual user account for each user, and an authenticated state (logged-in state) is kept using the shared user account.

In other words, there is no procedure for a user to log in each time the user perform an operation and to log out after the operation is completed.

One of the reasons for this is that having each user perform a login operation by entering a user name and password from a keyboard every time before operation will reduce operation efficiency.

If an insider performs an illegal operation on an operation monitoring system using an information terminal with a shared user account that is always kept in a logged in state, it will be difficult to identify a person who performed the operation and determine a specific content of the operation executed by the person.

Further, an access management function is usually incorporated into software such as an operating system (OS) or monitoring software running on an information terminal.

As a result, for an operation monitoring system including an information terminal that does not have any access management mechanism incorporated therein from the beginning, software replacement or update is needed when the access management function is installed in the information terminal.

It is, however, costly and difficult in general to replace or update the software of an information terminal provided in an operation monitoring system, for instance, due to high reliability demanded for the system.

This is because, for instance, when software is added to an information terminal provided in an operation monitoring system, functional verification, operation verification, etc., are required such as verifying if the added software function(s) affect existing software functions (software programs already installed on the information terminal) and operating timing thereof, and these verifications require a great deal of man-hours.

Further, when an impact on an actual machinery such as facilities of the operation monitoring system is taken into consideration, it may be difficult to test the functions of the added software while the actual machinery is in operation.

Even for an information terminal provided in such a system environment (an information terminal that uses a shared user account or that does not have a login function), it is desirable to provide a part or all of the following with respect to an operation performed on the information terminal without modifying the existing software already installed on the information terminal.
1) Mechanism capable to identify the person who performed the operation;
2) Mechanism capable to grasp content of the operation performed by the person; and
3) Mechanism capable to invalidate an operation that exceeds an authority range given to the person, or generate waring for such an operation.

Further, as a configuration for an external memory without an information encryption function to be able to deal with sensitive information, Patent Literature 1 discloses a security adapter having a first interface that transmits/receives information used with a computer apparatus (user terminal), a second interface that transmits/receives information used with an external memory (USB (Universal Serial Bus) memory, USB hard disk, etc.) and transmits/receives information used with an external memory with a security area for storing sensitive information, and a controller provided between the first interface and the second interface. The controller performs a security process of determining whether or not a user is a legitimate user authorized to access the security area at least based on authentication information sent via the computer apparatus.

Then, on condition that the user of the computer apparatus is determined to be a legitimate user in the security process, the controller reads/writes sensitive information from/to the security area according to a request from the computer apparatus.

Japanese Patent Kokai Publication No. JP2008-197963A

SUMMARY

For an operation on an information terminal that uses a shared user account or that does not have a login function, it is desirable to realize an access management mechanism enabling at least one or all of the following functions, preferably without modifying software running on the information terminal.
1) enabling to identify a person who performed the operation;
2) enabling to grasp content of the operation performed by the person; and
3) enabling to invalidate an operation that exceeds a authority range given to the person, or generate warning for such an operation.

Therefore, it is an object of the present invention to provide an apparatus, method, and non-transitory medium, each enabling to realize an access management mechanism solving at least one of the above problems.

According to an aspect of the present invention, there is provided an operation authentication relay apparatus connected between an information terminal and at least one peripheral device communicatively connected to the information terminal, wherein the operation authentication relay apparatus is configured to be recognized as a peripheral device by the information terminal, and recognized as an information terminal by the peripheral device, and wherein the operation authentication relay apparatus comprises authentication means for authenticating a user using the information terminal by operating the peripheral device and control means for controlling relaying of a signal between the peripheral device and the information terminal, based on an authentication result of the user by the authentication means.

According to another aspect of the present invention, there is provided an operation authentication relay method of an operation authentication relay apparatus connected between an information terminal and at least one peripheral device communicatively connected to the information terminal and supplying information to the information terminal, wherein the operation authentication relay method comprises:

the relay apparatus being recognized as a peripheral device by the information terminal and as an information terminal by the peripheral device;

authenticating a user using the information terminal by operating the peripheral device; and controlling relaying of an operation signal of the peripheral device by the user to the information terminal, based on an authentication result of the user.

According to another aspect of the present invention, there is provided a program causing a computer constituting an operation authentication relay apparatus connected between an information terminal and at least one peripheral device communicatively connected to the information terminal and supplying information to the information terminal to execute processing comprising:

controlling the operation authentication relay apparatus to be recognized as a peripheral device by the information terminal and to be recognized as an information terminal by the peripheral device;

authenticating a user using the information terminal by operating the peripheral device; and controlling relaying of an operation signal of the peripheral device operated by the user to the information terminal, based on an authentication result of the user.

According to the present invention, there is provided a non-transitory computer-readable recording medium storing the program (e.g., a semiconductor storage such as RAM (Random Access Memory), ROM (Read-Only Memory) or EEPROM (Electrically Erasable and Programmable ROM)), HDD (Hard Disk Drive), CD (Compact Disc), and DVD (Digital Versatile Disc).

According to the present invention, an access management mechanism capable of solving at least one of the above problems can be realized.

BRIEF DESCRIPTION OF THE DRAWINGS

FIG. 9C is a drawing showing an example of an operation event history.

DETAILED DESCRIPTION

Figure 1A:
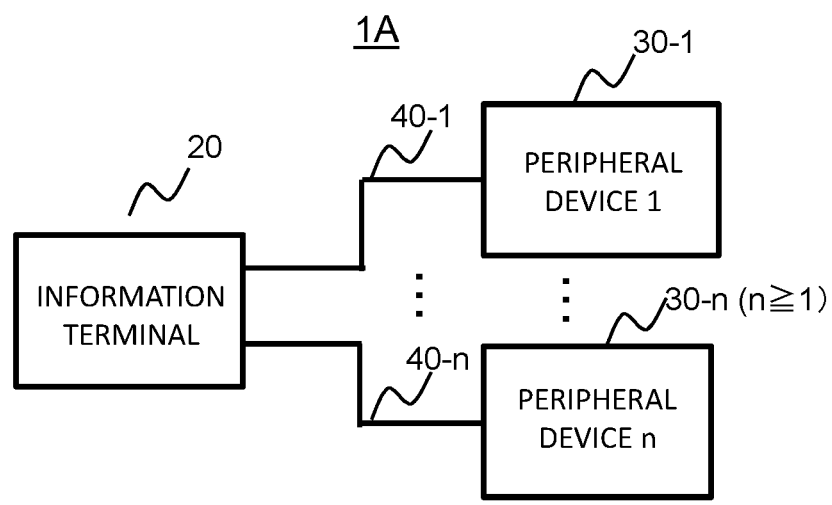
FIG. 1A is a diagram illustrating a related technology.
Figure 1B:
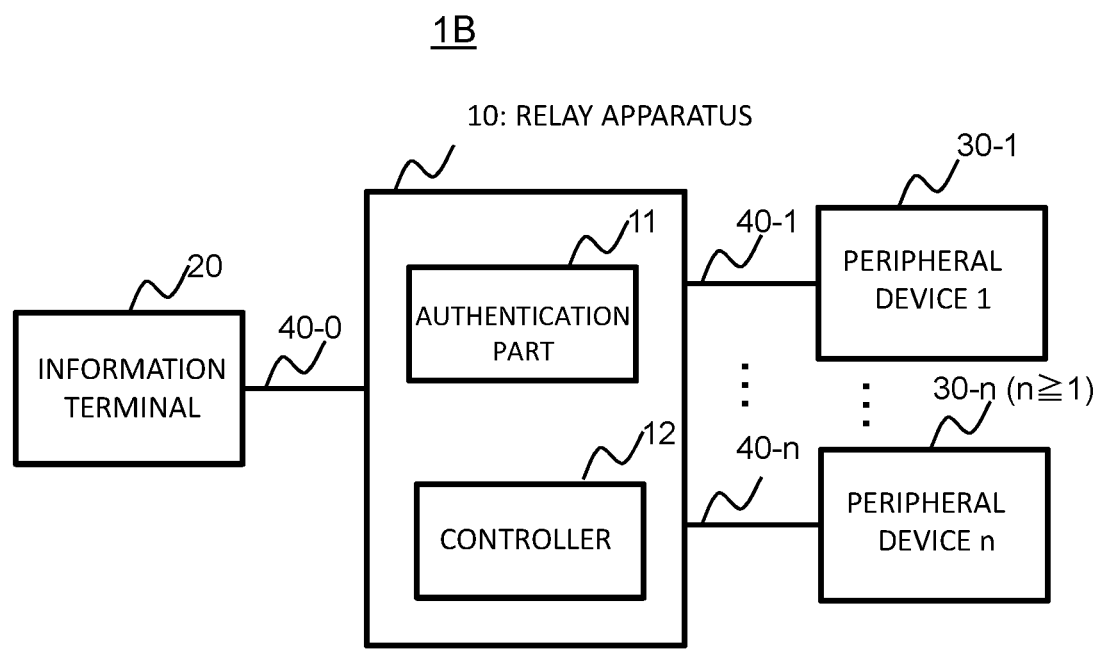
FIG. 1B is a diagram illustrating a mode of the present invention.

An example embodiment of the present invention will be described. FIGS. 1A and 1B are diagrams illustrating a system configuration as a premise of the present invention and a system according to an aspect of the present invention, respectively.

In FIG. 1A, a system 1A includes an information terminal 20, peripheral devices 30-1 to 30-$n$ used by a user (operator) to operate the information terminal 20, and wired or wireless communication interfaces 40-1 to 40-$n$ in charge of communication between the information terminal 20 and the peripheral devices 30-1 to 30-$n$, respectively. For instance, the information terminal 20 may be a PC (Personal Computer) constituting an operation monitoring system. In this case, the operation monitoring system may be, for instance, a power system monitoring and control system that controls and monitors an amount of power generated at a power plant, and the information terminal 20 may be a PC functioning as a console. Further, as described above, the information terminal 20 may use, for instance, a shared user account or be without a login function. The same applies to the following example embodiments.

Further, although FIG. 1A only shows a single information terminal 20 for simplicity, there may be a plurality of information terminals 20 (the number thereof is not limited). Note that "n" in the peripheral devices 30-1 to 30-$n$ and the communication interfaces 40-1, . . . , 40-$n$ connected to the information terminal 20 is 1 or greater (i.e., there may be only one peripheral device 30). Regarding reference signs given to elements in the drawings, when it is not particularly necessary to distinguish an element by specifying a branch number (for instance, when it is unnecessary to distinguish and refer to an individual element), the element is indicated without a branch number attached, as in the peripheral device 30, the communication interface 40, etc. The same applies to the following example embodiments.

As illustrated in FIG. 1B, compared with the system 1A in FIG. 1A, a system 1B relating to an aspect of the present invention, an operation authentication relay apparatus 10 (abbreviated as "relay apparatus" hereinafter) that performs operation authentication, is provided between the information terminal 20 and the peripheral devices 30. The relay apparatus 10 is connected to the peripheral devices 30-1 to 30-$n$ via the communication interface 40-1 to 40-$n$. The information terminal 20 is connected to the relay apparatus 10 via a communication interface 40-0. Note that the relay apparatus 10 may be an apparatus configured to be logically connected in communication paths between the information terminal 20 and the peripheral devices 30. In this case, the relay apparatus 10 may be provided in a housing of the information terminal 20 for instance. As described in the example embodiments below, the communication interfaces 40-0, 40-1 to 40-$n$ may be the same communication interface or may include different communication interfaces.

In FIG. 1B, the peripheral devices (e.g., a keyboard or pointing device such as a mouse) used by a user when performing an operation on the information terminal 20 may be connected to the information terminal 20 via the relay apparatus 10. A NIC (Network Interface Card) such as a LAN (Local Area Network) adapter, HDD (Hard Disk Drive) and the like, which are peripheral devices of the information terminal 20, may be directly connected to the information terminal 20 without going through the relay apparatus 10.

In FIG. 1B, the information terminal 20 uses a shared user account for each user and remains logged in after an initial login until a next shutdown for instance, as a non-limiting example. Alternatively, the information terminal 20 may be a terminal not equipped with a login function.

The relay apparatus 10 includes an authentication part 11 that authenticates a user who uses the information terminal 20 by operating the peripheral device 30, and a controller 12 that performs control to cut off communication between the peripheral device 30 and the information terminal 20 based on an authentication result of the authentication part 11.

In the present example embodiment, the relay apparatus 10 is configured to be recognized as a peripheral device by the information terminal 20.

In the present example embodiment, the relay apparatus 10 may be configured be recognized as an information terminal by the peripheral devices 30.

The relay apparatus 10 connected to a plurality of the peripheral devices 30 may be configured to be recognized by the information terminal 20 as a single composite peripheral device having functions of the plurality of peripheral devices 30.

In the relay apparatus 10, the controller 12 may control to cause an operation event exchanged between the peripheral device 30 and the information terminal 20 via the communication interface 40 to be passed or blocked, based on a user attribute or the like, which is the authentication result of the authentication part 11.

In the relay apparatus 10, the controller 12 may control to cause an operation event exchanged between the peripheral device 30 and the information terminal 20 via the communication interface 40 to be passed or blocked according to an authentication result of a user, and a type of the peripheral device 30 and a combination of operation events.

The controller 12 may be configured to store an operation event between the information terminal 20 and the peripheral device 30 in a storage part.

In the relay apparatus 10, the controller 12 may be configured to generate an appropriate operation event in place of (on behalf of) the peripheral device 30 and transmit the generated operation event to the information terminal 20 according to an authentication result of the authentication part 11 (based on the authentication result, or at the output timing of the authentication result).

In the relay apparatus 10, the authentication part 11 may be configured to store an authentication history of a user in a storage part. The controller 12 may extract (identify) operation content performed by a user with the peripheral device 30 by associating the authentication history of the user with a history of operation events performed by the user.

In relay apparatus 10, the authentication part 11 may identify access right information associated with a user based on a result of biometric authentication of the user such as face recognition (biometric authentication results). The controller 12 may be configured to control signal relaying between the information terminal 20 and the peripheral device 30 operated by a user based on the access right information associated with the user and obtained by the authentication part 11.

In the relay apparatus 10, the controller 12 may be configured to invalidate an operation of the peripheral device 30 exceeding the access right information of a user or give a warning when detecting such an operation.

In a case where the peripheral device 30 connected to the relay apparatus 10 includes an input device such as a mouse and keyboard, the controller 12 of the relay apparatus 10 may control information displayed on a screen of a display device of the information terminal 20 (e.g., controlling brightness of display information to make a part of display content on the screen invisible (or hard to see) or cut off the display signals), or control entry from the screen (for instance, a specific area(s) thereof) of the display device by the input devices such as a mouse and keyboard (e.g., a mouse cursor operation) and operations of icons, buttons, etc., displayed on the screen based on the access right information of a user acquired by the authentication part 11.

In the relay apparatus 10, the authentication part 11 may perform authentication repeatedly preferably at a predetermined time interval.

In the relay apparatus 10 connected to a plurality of the peripheral devices 30, the controller 12 may be configured to rewrite device identification information of control plane so that a plurality of peripheral devices 30 are seen as a single peripheral device from the information terminal 20 and notify the information terminal 20 of the rewritten device identification information. In this case, the information terminal 20 recognizes the relay apparatus 10 connected to the plurality of peripheral devices 30 as a pseudo-composite device equipped with each function of each of the plurality of peripheral devices 30. Further, when a type of a component devices changes such as when the plurality of peripheral devices 30 connected to the relay apparatus 10 change from, for instance, peripheral devices A and B to peripheral devices A and C, the controller 12 of the relay apparatus 10 may be configured to notify the information terminal 20 of device identification information different from the device identification information described above. In this case, the information terminal 20 recognizes the relay apparatus 10 connected to the peripheral devices 30 having a type changed, as a pseudo-composite device equipped with each function of each of the plurality of peripheral devices 30.

When a type or combination of one or more peripheral devices 30 connected to the relay apparatus 10 is changed, the controller 12 may be configured to control to cause the information terminal 20 to execute device identification processing again, after resetting a communication interface to the information terminal 20 (communication interface connected to the information terminal 20 and the peripheral device 30 via the relay apparatus 10).

Figure 2:
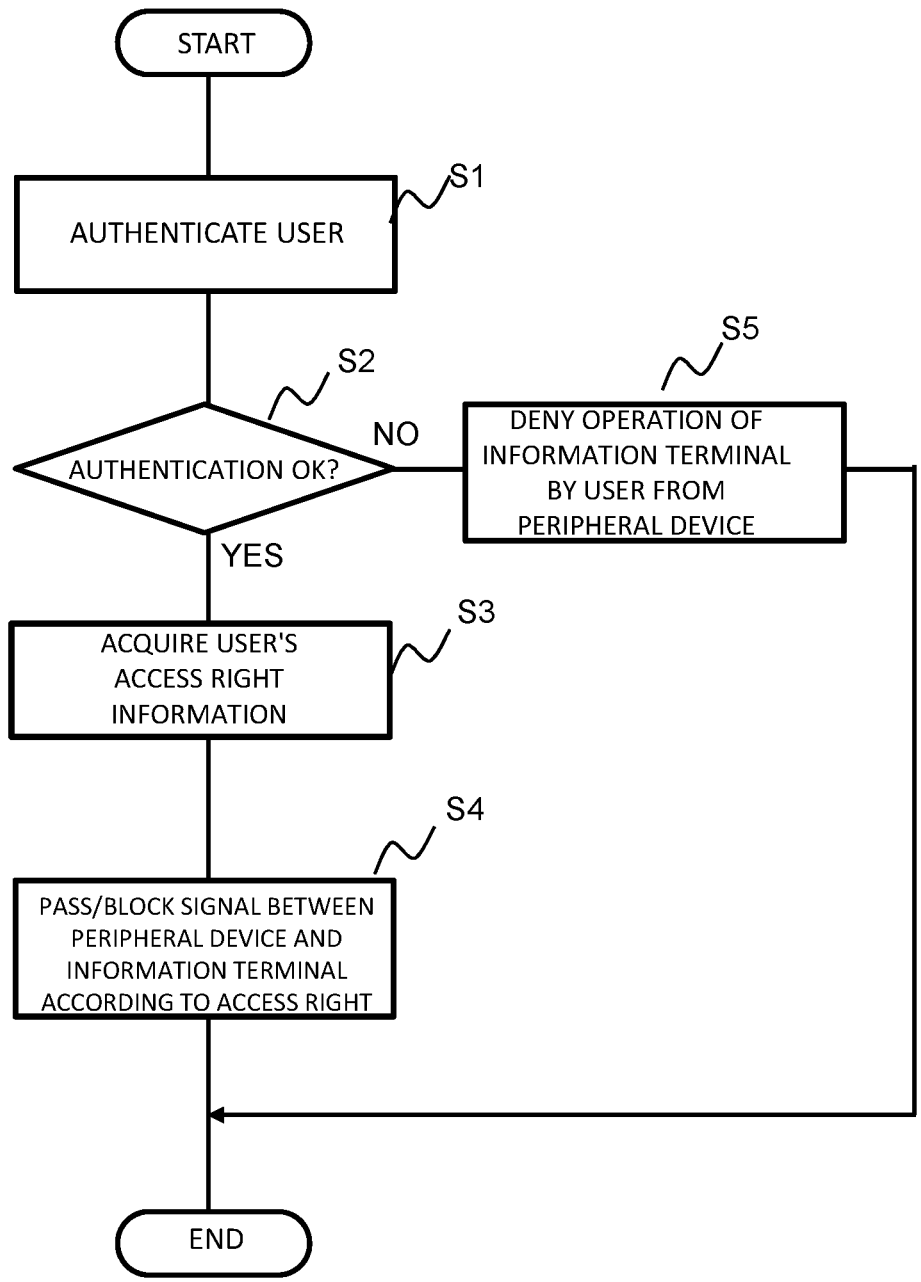
FIG. 2 is a diagram illustrating an operation in a mode of the present invention.

FIG. 2 is a diagram illustrating an example of an access control operation by the relay apparatus 10 described with reference to FIG. 1B. Referring to FIG. 2, the authentication part 11 authenticates a user of the information terminal 20 (step S1). When the authentication result is OK ("Yes" in step S2), the authentication part 11 acquires attribute information (access right) of the authenticated user (step S3). In this case, the relay apparatus 10 may access via communication means a database in which registration data for authentication and an access right(s) of a group to which the user belongs are registered in advance to acquire attribute information of the authenticated user (such as a department to which the user belongs, title, and access right information). The relay apparatus 10 may cache the acquired registration data for authentication and correspondence of the attribute information of the user in a memory within the relay apparatus 10.

The controller 12 of the relay apparatus 10 controls to permit (pass) or not-permit (block) data transfer between the peripheral device and the information terminal 20 according to the attribute information of the user (access right, etc.), which is the authentication result of the authentication part 11 (step S4). In the step S4, when detecting an operation beyond a range of the attribute information of the user (access right), the controller 12 of the relay apparatus 10 may invalidate the operation or generate warning for the operation.

When an authentication result of the authentication part 11 indicate failure ("No" in the step S2), the relay apparatus 10 denies the access of the user to the information terminal 20. In other words, data transfer between the peripheral device 30 and the information terminal 20 is denied (step S5). As a result, the user is not able to operate the information terminal 20 from the peripheral device 30.

In the relay apparatus 10, a sequence of the steps S1 to S5 in FIG. 2 may be preferably executed at a predetermined time interval (for instance, at each one second or the like). In this case, after the processes of the steps S1 to S5 in FIG. 2 have been executed in the relay apparatus 10, the authentication process in the step S1 in FIG. 2 is performed again when a built-in timer (not illustrated) indicates that the predetermined time has elapsed, and the steps S3 and S4 or the step S5 is executed according to the authentication result.

According to the present example embodiment, the controller 12 in the relay apparatus 10 may be configured to be able to identify a user who executed an operation (predetermined operation) of the peripheral device 30 based on a result of user identification by the authentication part 11. For instance, the controller 12 in the relay apparatus 10 may be configured to be able to monitor a signal forwarded between the peripheral device 30 and the information terminal 20, record a history (operation event history) in association with a time at which the signal is forwarded, extract an operation event between the peripheral device 30 and information terminal 20 associated with an operation executed by a user based on an authentication result of the user by the authentication part 11 and the time history (information indicating that a specific user was identified at what time (what hour and minutes), and determine the operation history of the user in detail.

Figure 3:
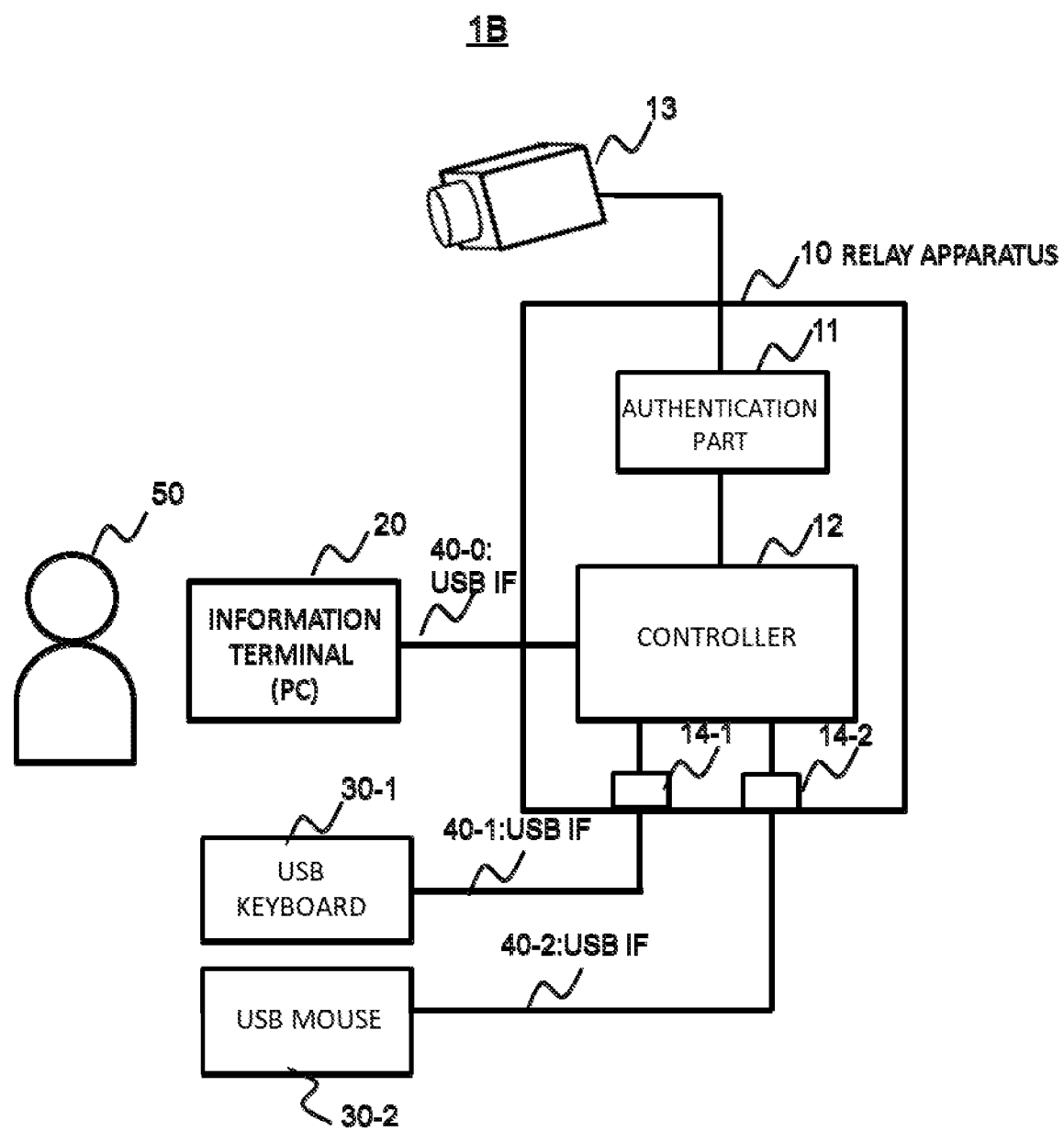
FIG. 3 is a diagram illustrating an example embodiment of the present invention.

FIG. 3 is a diagram illustrating a first example embodiment of the present invention and schematically illustrating an example of the system 1B described with reference to FIG. 1B. In this example embodiment, the drawing schematically illustrates a configuration in which USB (Universal Serial Bus) is used as the communication interface 40 in FIG. 1B, a USB keyboard 30-1 and a USB mouse 30-2 are used as the peripheral devices 30 of the information terminal 20, and the authentication part 11 performs face authentication of a user 50 using a camera 13. Note that the USB keyboard 30-1 and the USB mouse 30-2 are simply referred to as USB devices 30 when these are not distinguished. Further, the reference sign 40 (the communication interface) denotes the USB interface.

The authentication part 11 acquires image data captured by the camera 13 and performs face detection of the user 50 in the image data. The authentication part 11 compares detected face image with photographs of persons (e.g., employees, permatemps, etc.) registered in advance to identify the user captured with the camera 13 among registered persons. Note that the camera 13 may be a camera built into the information terminal 20 (web camera built into a top of a screen). In this case, the authentication part 11 acquires the image data (digital data) captured by the camera 13 of the information terminal 20 via predetermined communication means.

The authentication part 11 refers to access right registered in advance in terms of the user 50 who has been identified as a registered person as a result of face authentication, and outputs to the controller access right information of the user 50 with respect to the information terminal 20.

The access right information of the user 50 with respect to the information terminal 20 may be managed in groups, for instance, indicating whether the user 50 belongs to an administrator group allowed to enter and set a parameter(s) from the information terminal 20, or to a browsing group not allowed to enter and set a parameter(s) from the information terminal 20. As a matter of course, when the number of users having an opportunity to operate the information terminal 20 is small, an access right may be configured for each user.

For instance, the access right information of the user 50 may specify any or combinations of the following access restrictions, though not limited thereto.
a) No operation on the information terminal 20 is permitted (no operation on all the peripheral devices 30 is permitted).
b) Operation is permitted/not permitted on a per peripheral device 30 basis.
c) Operation is permitted/not permitted on a per operation type in the peripheral device 30 basis.
d) Operation on an area(s) on a screen of the information terminal 20 is permitted while operation on the other area(s) is not permitted.

In a), in the relay apparatus 10, any operation of the USB keyboard 30-1 and the USB mouse 30-2 by the user 50 is not permitted.

In the relay apparatus 10, for instance, when the authentication part 11 cannot match the user 50 to any registered person as a result of face authentication (the step S5 in FIG. 2), the authentication part 11 instructs the controller 12 to perform this access restriction.

In b), for instance, the relay apparatus 10 controls to disallow an operation of the USB keyboard 30-1 by the user 50.

In c), for instance, with respect to operations of the USB mouse 30-2 by the user 50, the relay apparatus 10 controls to allow or disallow each of the following operations.
Wheel (center button) operation (scroll operation and font size enlargement/reduction operation with a "Ctrl" key on the keyboard)
Left button operation (e.g., selection or determination)
Right button operation (calling function and menu)
Alternatively, in a case of the USB keyboard 30-1, for instance, the relay apparatus 10 controls to disallow an "Enter" key operation among key entries by the user 50.

In d), for instance, the relay apparatus 10 controls to allow or disallow each operation by the user 50 on a specific area(s) and on a specific icon(s) such as a bar(s) and a button(s) on the screen of the information terminal 20.

After acquiring image data from the camera 13 and detecting a face from the image data, the authentication part 11 informs the controller 12 that access by the user 50 is denied with respect to the applicable peripheral device 30 when, for instance,
A face of the user operating the information terminal 20 cannot be detected (the user has left his seat and is not in front of the camera)

Facial feature value of the person detected do not match those of any of people having their facial feature values registered
The person is determined to be registered as a result of face authentication, but he is not permitted to operate the information terminal 20

The controller 12 may invalidate the operation on the peripheral device 30 or notify an alarm from an alarm device (speaker, indicator light) not illustrated.

In FIG. 3, the relay apparatus 10 operates as a peripheral device (pseudo USB device) for the information terminal 20 and as a USB host for the peripheral devices 30 (USB keyboard 30-1, and USB mouse 30-2). In response to polling from the information terminal 20, the controller 12 of the relay apparatus 10 controls to return or not return data forwarded to the relay apparatus 10 from the peripheral devices 30 (the USB keyboard 30-1, the USB mouse 30-2) or change the data based on a result of identification by the authentication part 11.

Figure 4:
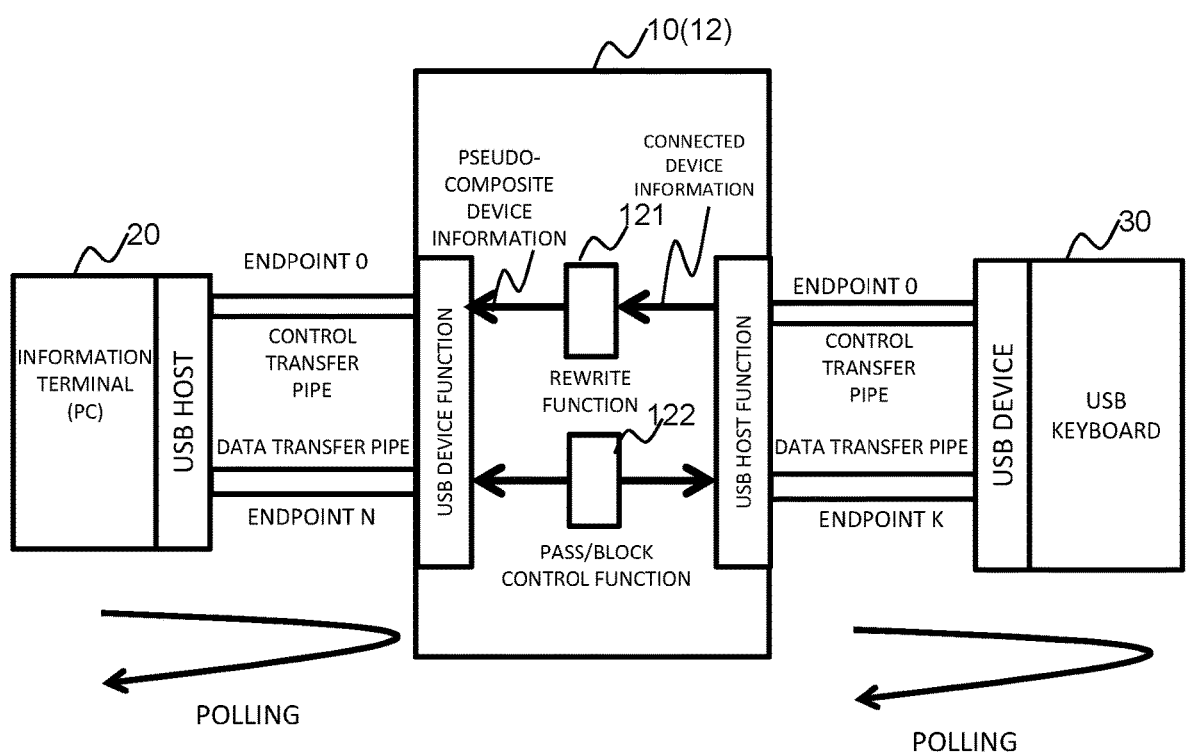
FIG. 4 is a diagram illustrating USB communication by a relay apparatus according to a first example embodiment of the present invention.

FIG. 4 is a diagram illustrating an example of a communication function of the controller 12 in the relay apparatus 10 illustrated in FIG. 3. USB communication is temporarily terminated by the controller 12. On control plane, generation of pseudo-composite device information (e.g., vendor ID (issued to each vendor from the USB Implementers Forum) and product ID (a vendor can freely assign an ID to each product) are rewritten) is performed from connected device information (device descriptors from a plurality of the USB devices 30 connected to the relay apparatus) received from a USB host function of the controller 12. The pseudo-composite device information is used as device information of a USB device function within the controller 12, which transmits the pseudo-composite device information to the information terminal 20 in response to a request for device information from the information terminal 20. The information terminal 20 receives the pseudo-composite device information and recognizes the USB device function within the controller 12, as a single pseudo-composite USB device.

On data plane, data is forwarded or blocked between the USB host function and the USB device function within the controller 12 for each device according to an authentication result. Polling is performed between the host and each device and there is no guarantee that the timing thereof is synchronized. The controller 12 keeps a polling result received from the USB device 30 under control thereof until the controller 12 receives polling from the USB host of the information terminal 20 next time.

The following further describes the operations on the control plane and the data plane in the relay apparatus 10. In the USB, there are, as transfer scheme between a USB device and USB host, control transfer, interrupt transfer, isochronous transfer, and bulk transfer. Out of these, for instance, the control transfer is used to initialize a USB device. The interrupt transfer is used to transfer a small amount of input data from a USB host to a USB device such as a USB keyboard or USB mouse by an interrupt, for instance. The isochronous transfer is used by a device that deals with audio and video such as a speaker and microphone for telephone and video conference to transfer a certain amount of data in a predetermined period. The bulk transfer is used to transfer a large amount of data for a printer or scanner.

Figure 5A:
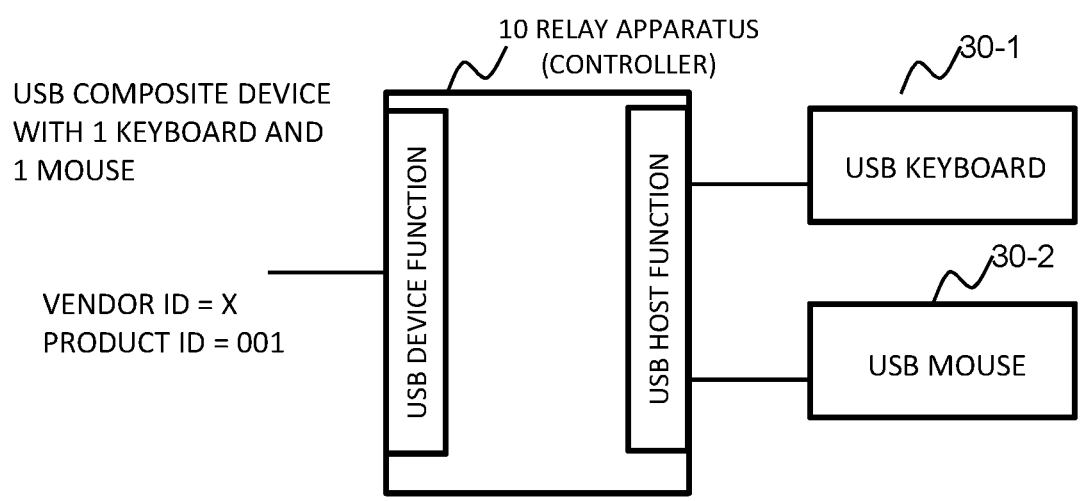
FIG. 5A is a diagram illustrating the first example embodiment of the present invention.

For instance, in a case where the USB keyboard 30-1 and the USB mouse 30-2 are connected one by one to the relay apparatus 10 as illustrated in FIG. 5A, the controller 12 of the relay apparatus 10 performs setting so that the USB device function of the relay apparatus 10 is recognized by the information terminal 20 as a single pseudo-composite device equipped with functions of both the USB keyboard 30-1 and the USB mouse 30-2.

Figure 5B:
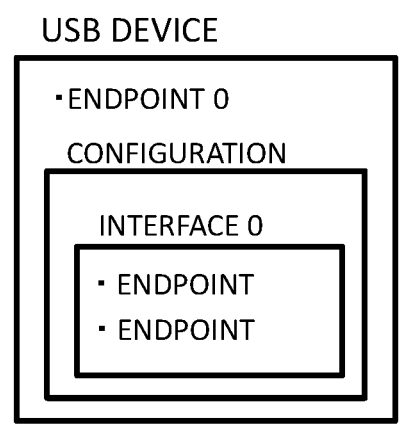
FIG. 5B is drawing illustrating a USB device.
Figure 5C:
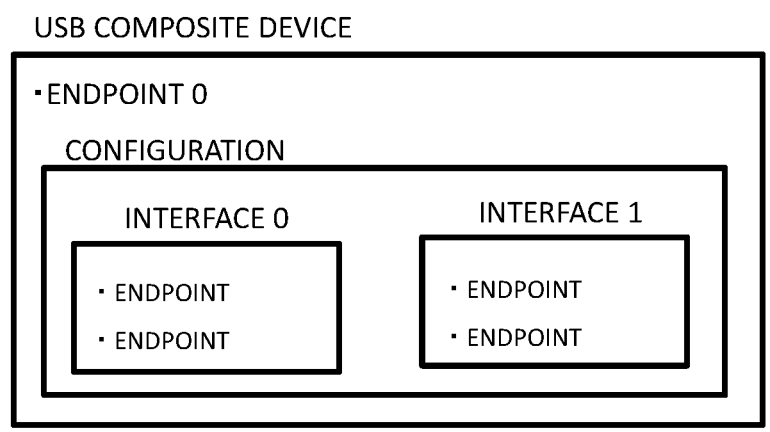
FIG. 5C is drawing illustrating a USB composite device.

As schematically illustrated in FIG. 5B, in the USB, the configuration of a device is described in the configuration descriptor, and the function of the device in the interface descriptor. As schematically illustrated in FIG. 5C, a USB composite device operates as a device with a plurality of functions by having a plurality of these interfaces. In the present example embodiment, the controller 12 of the relay apparatus 10 rewrites a vendor ID and a product ID, which are information elements in the device descriptor returned in response to a device descriptor request (GET_DESCRIPTOR (DEVICE)) transmitted from the information terminal 20, and informs the information terminal 20 that the relay apparatus 10 has a configuration as illustrated in FIG. 5C. The vendor ID and the product ID are used to identify a connected USB device.

The following describes an example of an operation (control transfer) of the relay apparatus 10 on the control plane. As described above, for instance, in a case where a plurality of USB devices are connected to the relay apparatus 10, the controller 20 of the relay apparatus 10 notifies the information terminal 20 of the device information (pseudo-composite device information) so that the information terminal 20 sees a single pseudo-composite device equipped with functions of each of the plurality of USB devices. In a USB device, the device configuration is described in the device descriptor, the configuration descriptor, and the like, and the functions of the device in the interface descriptor, etc. As schematically illustrated in FIG. 5C, a USB composite device operates as a device having a plurality of functions by having a plurality of interfaces.

A rewrite function 121 of the controller 12 of the relay apparatus 10 rewrites the vendor ID and the product ID, which are information elements in the device descriptor, in response to a device descriptor request (GET_DESCRIPTOR (DEVICE)) transmitted from the information terminal 20 to the USB device function of the controller 12 via a control transfer, and generates a device descriptor for a pseudo-composite USB device. The generated device descriptor of a pseudo-composite USB device is notified to the information terminal 20 via the USB device function of the controller 12.

Figure 6:
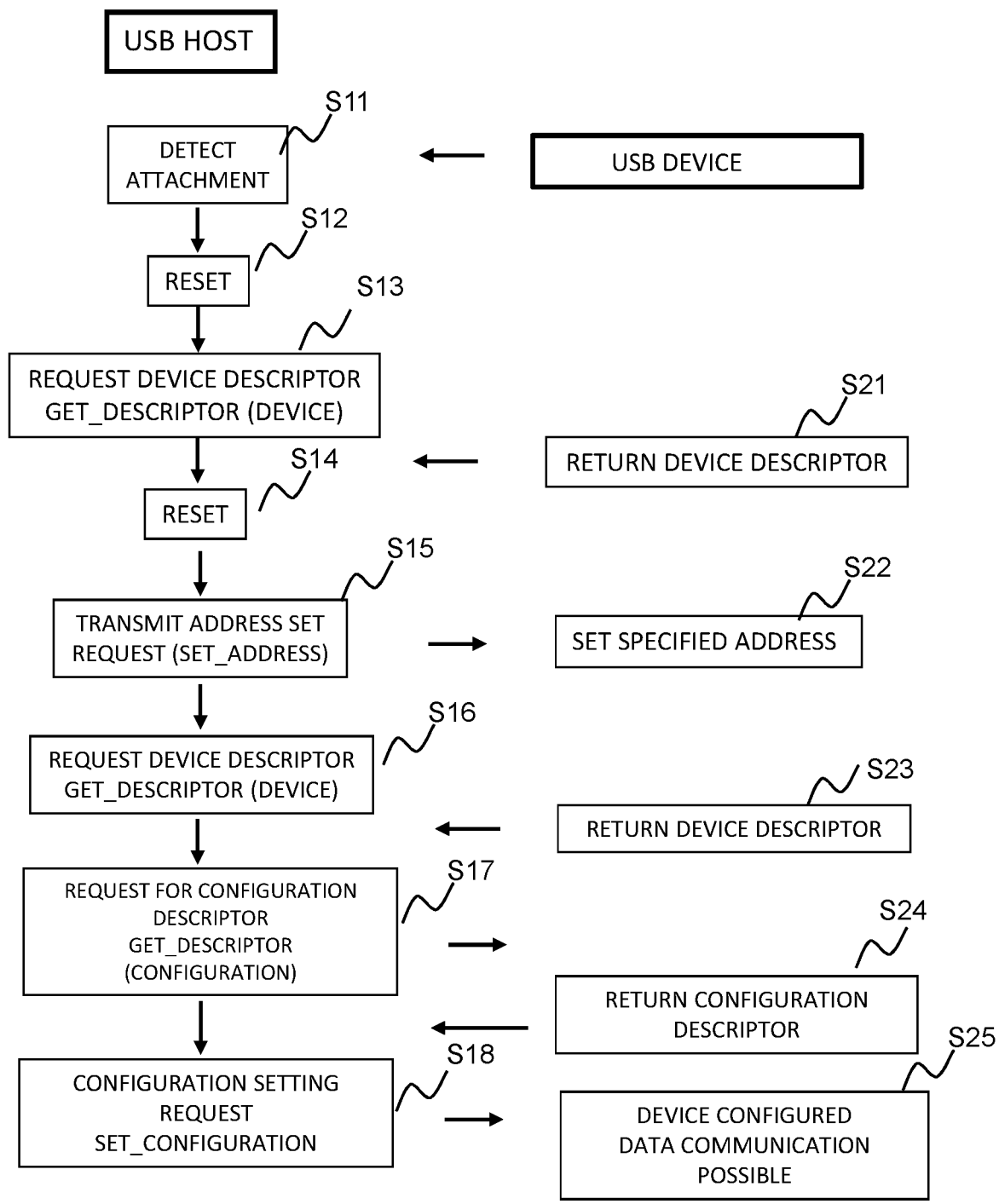
FIG. 6 is a diagram illustrating a control transfer in the first example embodiment of the present invention.

FIG. 6 is a diagram schematically illustrating an outline of a USB plug-and-play connection procedure in the present example embodiment. For instance, when the USB keyboard 30-1 and the USB mouse 30-2 are connected to a USB port of the relay apparatus 10 with the power on, the USB host function within the controller 12 illustrated in FIG. 4 may operate as the USB host as illustrated in FIG. 6 for the USB devices 30. Note that the relay apparatus 10 has a DC power supply voltage supplied to internal circuits thereof using for instance, an AC adapter (AC-DC converter) that converts commercial AC power to DC power and a DC-DC converter that generates a desired DC voltage from a DC voltage, as a non-limiting example. In this case, the USB device function in the controller 12 in FIG. 4 functions as a self-powered device with a built-in power supply, as viewed from the information terminal 20.

When the USB host function within the controller 12 of the relay apparatus 10 detects that a cable from the USB device 30 is connected to a USB port thereof (either of two USB data signal lines D+ and D− is at 3.3V) ("DETECT ATTACHMENT" in S11), the USB host function within the controller 12 illustrated in FIG. 4 outputs a first RESET (the two USB data signal lines D+ and D− are kept at a low level for a predetermined period) (S12) and starts a control transfer.

The USB host function in the controller 12 illustrated in FIG. 4 transmits a request for a device descriptor (GET_DESCRIPTOR (DEVICE)) to the USB device (S13). The USB device (the USB device function such as the USB keyboard 30 illustrated in FIG. 4) returns the first 8 bytes of the device descriptor (S21). The USB host function in the controller 12 outputs a second RESET immediately thereafter (S14).

The USB host function in the controller 12 illustrated in FIG. 4 transmits an address set request (SET_ADDRESS) (S15). The USB device (30 in FIG. 4) sets the specified address (S22), and the USB host function in the controller 12 illustrated in FIG. 4 and the USB device (30 in FIG. 4) start to communicate using this address. Next, the USB host function in the controller 12 illustrated in FIG. 4 transmits a request for a device descriptor (GET_DESCRIPTOR (DEVICE)) (S16), and the USB device (30 in FIG. 4) transmits the remainder of the device descriptor (including the vendor ID (idVendor) and the product ID (idProduct)) (S23). Then, the USB host function in the controller 12 in FIG. 4 transmits a request for a configuration descriptor (GET_DESCRIPTOR (CONFIGURATION)) (S17), and the USB device (30 in FIG. 4) returns a configuration descriptor (S24).

The USB host function in the controller 12 in FIG. 4 transmits a configuration setting request (S18), and after the USB device 30 completes configuration (S25), the USB device 30 is able to perform data communication with the relay apparatus 10. Note that, in a case where the relay apparatus 10 is not connected to the information terminal 20, the relay apparatus 10 may not poll the USB device 30.

The device descriptor (one for each device, fixed to 18 bytes) includes information such as USB class (bDeviceClass), USB subclass (bDeviceSubClass), vendor ID (idVendor), product ID (idProduct), and the number of configuration descriptors. The configuration descriptor describes configuration information of the device and includes a configuration number and the number of interfaces (interface descriptors). The interface descriptor is a descriptor for describing the function of the device, and includes an interface number, USB class, subclass, protocol information, and the number of endpoints. The endpoint descriptor (fixed to 7 bytes) includes data transfer type, transfer direction, packet size, and polling time of the endpoint.

An endpoint is a point that terminates a logical communication path between a USB host and a USB device, and is constituted by a buffer such as a FIFO (First In First Out) buffer. When configuring data communication, the information terminal 20 (USB host) determines the number of endpoints in the USB device and a transfer method and direction of each endpoint and sets the determined information in the USB host function. A buffer of the USB host and an endpoint (FIFO buffer) of the USB device are connected by a pipe, which is a logical communication line. Once actual communication is started, a controller in the USB device identifies packets over the USB bus and distributes them to each endpoint. Endpoint 0 is used only for control transfers.

The rewrite function 121 of the controller 12 illustrated in FIG. 4 rewrites a vendor ID and a product ID in the device descriptor based on the descriptor information acquired from the USB device 30, and further creates a device descriptor, configuration descriptor, interface descriptor, etc., corresponding to the configuration of the USB composite device as illustrated in FIG. 5C. In a case where only a single USB device 30 is connected to the relay apparatus 10, the controller 12 may notify this to the information terminal 20 as a pseudo-single USB device. In this case, the controller 12 of the relay apparatus 10 may not rewrite the product ID in the descriptor acquired from the USB device 30.

When a USB cable (plug) is connected to a USB port of the information terminal 20 from the relay apparatus 10, the information terminal 20 operates as USB HOST in FIG. 6 and the USB device function in the controller 12 of the relay apparatus 10 operates as USB DEVICE in FIG. 6. Having detected an attachment and performed a reset, the information terminal 20 executes the steps S13 to S18 in FIG. 6, and the USB device function in the controller 12 of the relay apparatus 10 performs the processes of S21 to S25 in FIG. 6. In other words, in response to a device descriptor request from the information terminal 20 (S16 in FIG. 6), the USB device function within the controller 12 returns a device descriptor in which the vendor ID (idVendor) and the product ID (idProduct) are rewritten to those of a pseudo-composite USB device (S23). Further, in response to a configuration descriptor request from the information terminal 20 (S17), the USB device function in the controller 12 returns to the information terminal 20 a configuration descriptor in which the configuration of the relay apparatus 10 is set to the number of interfaces corresponding to the composite device.

The operating system (OS) of the information terminal 20 searches for a device driver for the USB device based on the vendor ID (idVendor) and the product ID (idProduct) and invokes a corresponding device driver. Since the USB keyboard 30-1 and the USB mouse 30-2 are in the HID (Human Interface Device) device class, a standard device driver is loaded for each device in the information terminal 20. Then, communication is performed between corresponding endpoints between the information terminal 20 and the relay apparatus 10 and between the relay apparatus 10 and the USB devices 30.

Figure 7A:
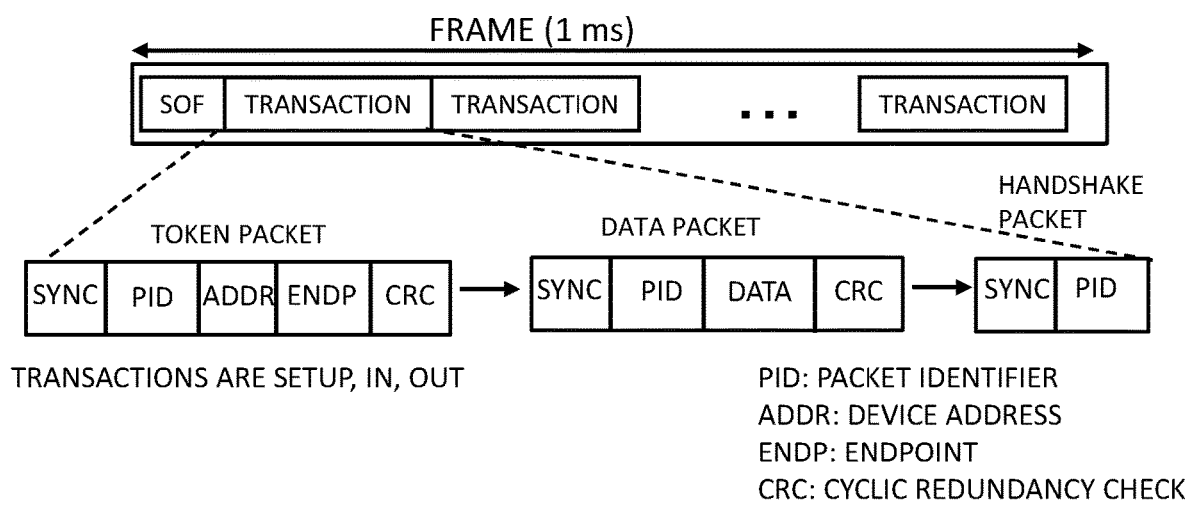
FIG. 7A is a diagram illustrating a USB frame.

On the USB bus, data is transferred in a unit called a frame (1 ms (millisecond) cycle). As illustrated in FIG. 7A, a frame starts with an SOF (Start Of Frame) packet and includes a plurality of transactions. Each transaction includes USB packets such as a token packet, a data packet, and a handshake packet.

The token packet is constituted by
SYNC data for synchronization (8 bits),
PID (Packet Identifier) indicating the packet type (8 bits),
Device address (ADDR) (7 bits),
Endpoint (ENDP) (4 bits), and
CRC5 (Cyclic Redundancy Check) for error detection (5 bits).
The PID is constituted by any of the following.
IN (transfer to host)
OUT (transfer from host to device endpoint)
SOF (Start Of Frame)
SETUP (control transfer)
The data packet is constituted by SYNC, PID, and CRC16 (16-bit CRC).

The PID of the handshake packet includes ACK (data successfully received), NAK (unsuccessful data transfer), and STALL (error at an endpoint; device inoperable, etc.).

As described above, the interrupt transfer is used to transfer a small amount of input data for a USB keyboard or USB mouse (HID devices). In other words, in USB 2.0 or USB 1.1, the USB devices 30 such as the USB keyboard 30-1 and the USB mouse 30-2 do not actively notify the information terminal 20 (USB host) of their operations, but the information terminal 20 asks the USB keyboard 30-1 and the USB mouse 30-2 at a predetermined interval by performing inquiry (polling) to see whether the USB keyboard 30-1 and the USB mouse 30-2 are operated (inquiring whether or not there is data at the endpoints (FIFO buffers) of the USB keyboard 30-1 and the USB mouse 30-2). When the USB devices 30 have data at the endpoints thereof, the USB devices 30 transmit the data to the information terminal 20. Note that polling is eliminated in USB 3.0, and the USB devices 30 can send a request to the USB host to start communication when the USB devices 30 want to transmit data.

Figure 7B:
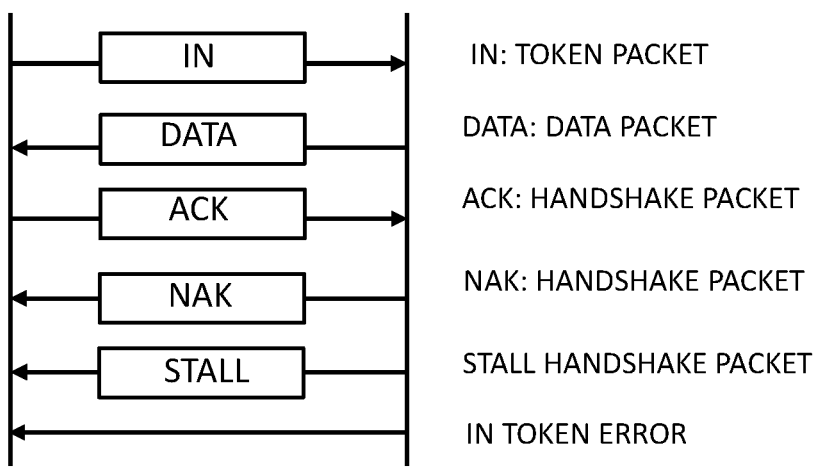
FIG. 7B is a diagram illustrating an interrupt input transaction.

In a case of an interrupt input transfer, for instance, as illustrated in FIG. 7B, the information terminal 20, which is the USB host, transmits a token packet with PID set to input (IN) to the USB device, and the USB device transmits to the USB host a data packet (DATA) including data related to the USB host interrupt. When successfully receiving the data packet, the USB host returns an acknowledgment (ACK) to the USB device. Further, the USB device returns a negative acknowledgment (NAK) if there is no pending data at the endpoint specified by the IN token packet (interrupted endpoint) when receiving the IN token packet from the host (at a time of polling). When an error has occurred at the interrupted endpoint of the USB device, the USB device returns an error (STALL; device inoperable). Furthermore, when the IN token packet from the USB host is an error, the USB device does not return anything.

Figure 7C:
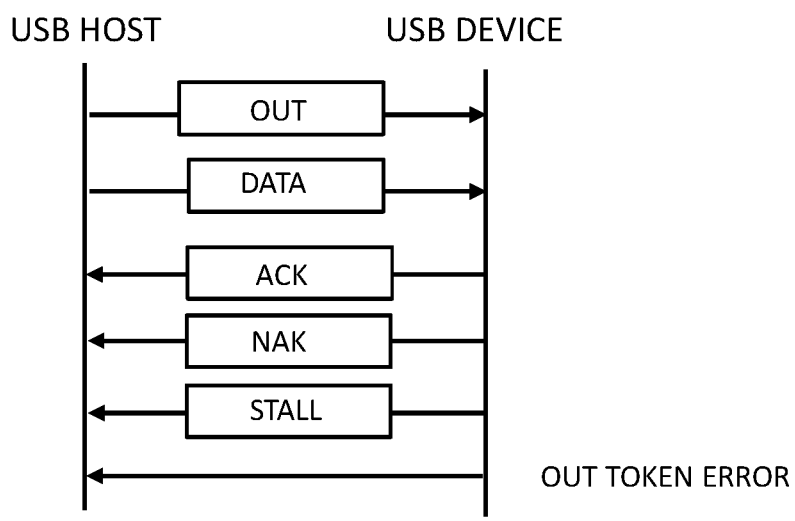
FIG. 7C is a diagram illustrating an interrupt output transaction.

In a case of an interrupt output transfer, as illustrated in FIG. 7C, the information terminal 20, the USB host, transmits a token packet with PID set to output (OUT). Then, the USB host transmits one or more data packets (DATA) to the USB device. When successfully receiving one or more data packets transmitted from the USB host, the USB device returns an acknowledgment (ACK) to the USB host. Conversely, when failing to receive the data packets from the USB host (because the endpoint buffer is not empty, for instance), the USB device returns a negative acknowledgment (NAK) to the USB host and asks the host to resend the data packets. Further, when the USB device is inoperative due to, for instance, an endpoint error, the USB device returns a STALL to the USB host.

When the USB device 30 receives polling (e.g., an IN token packet) from the USB host function in the controller 12 of the relay apparatus 10 in FIG. 4, the USB device 30 returns a data packet including data held in an endpoint (buffer) of the USB device 30 to the USB host function in the controller 12.

The USB host function in the controller 12 of the relay apparatus 10 hands the data from the USB device 30 over to a pass/block control function 122 within the controller 12.

Based in an authentication result of the authentication part 11, the pass/block control function 122 in the controller 12 performs one of the following control operations on the data received from the USB host function in the controller 12:
forward the data to the USB device function within the controller 12, or
discard the data When forwarding the data received from the USB host function in the controller 12, the pass/block control function 122 in the controller 12 hands over the data to the USB device function within the controller 12, and the data is set to an endpoint in the USB device function in the controller 12.

When the relay apparatus 10 receives polling (e.g., receiving an IN token packet) from the information terminal 20 and there is data at an endpoint of the USB device function of the controller 12, the relay apparatus 10 returns the data in a data packet. Note that the USB host function of the relay apparatus 10 can obtain information on endpoints of each USB device (USB device function) from the device connection information (the configuration descriptor (defining the number of interfaces), the interface descriptor (defining the number of endpoints), and the endpoint descriptor) from the USB device 30, and the USB host function of the information terminal 20 can obtain the same from the device connection information (the configuration descriptor (defining the number of interfaces), the interface descriptor (defining the number of endpoints), and the endpoint descriptor) from the USB device function within the controller 12.

As described above, polling is performed between the information terminal 20 (USB host) and the USB device function of the relay apparatus 10 and between the USB host function of the relay apparatus 10 and the USB device 30. Therefore, the USB device function within the controller 12 holds data transmitted by the USB device 30 under control thereof in response to polling from the USB host function in the controller 12 and received via the pass/block control function 122 until the USB device function in the controller 12 receives polling from the information terminal 20 as the USB host next time.

Further, as a history, the pass/block control function 122 of the controller 12 may log data exchanged with the USB host function in the controller 12, data exchanged with the USB device function in the controller 12, date and time (time information), and processing content (e.g., discarding data from the USB device 30), and as necessary, it may also record the operation of the USB device 30 extracted from the data received from the USB host function in the controller 12 if it is possible.

When the access right currently granted to a user by the authentication part 11 does not permit a specific operation on the USB device 30 (operation on a specific button of the USB mouse), for instance, the pass/block control function 122 of the controller 12 may perform the following.

On reception of data from the USB host function within the controller 12 which receives the data transmitted from the USB device 20 in response to polling thereto, the pass/block control function 122 analyzes the data received from the USB host function in the controller 12. As a result of the analysis, the pass/block control function 122 may perform control as described in the following.
When the data does not correspond to the operation not permitted, the pass/block control function 122 forwards the data to the USB device function of the controller 12.
When the data includes information (code) that corresponds to the operation not permitted, for instance, the pass/block control function 122 rewrites the data and forwards the rewritten data to the USB device function of the controller 12.
When the data includes information (code) that corresponds to the operation not permitted, the pass/block control function 122 discards the data.

As described above, according to an authentication result of the authentication part 11, i.e., the attribute of the user, the pass/block control function 122 of the controller 12 controls to return or block data transmitted from the USB device 30 in response to polling from the USB host function in the controller 12.

The attribute information acquired by the authentication part 11 as a result of authentication of a user may be, for instance, identification information (ID), job title and department information, and access right information. The access right information is information for controlling access permission with respect to read/write operations on a peripheral device, and for instance, a plurality of users may be grouped according to their access right. Then, the access right information may be set for each user according to the group (administrators group, browsing group, etc.) to which he belongs.

The pass/block control function 122 of the controller 12 may forward (pass), or discard (block) data received by the USB host function in the controller 12 to the USB device function in the controller 12 according to a combination of a type of the USB device 30 and contents of the operation, in addition to an authentication result of the authentication part 11.

For instance, in a case where, as an authentication result of the authentication part 11, it is determined that a user belongs to a browsing group (which is permitted to browse a display of the information terminal 20), the pass/block control function 122 of the controller 12 may forward (pass) only data received from the USB mouse 30-2 via the USB host function in the controller 12 to the USB device function in the controller 12. In other words, in this case, the pass/block control function 122 of the controller 12 discards data received from the USB keyboard 30-1 via the USB host function in the controller 12.

Alternatively, when it is determined that a user belongs to Group A, the pass/block control function 122 of the controller 12 may analyze content of data received from the USB mouse 30-2 via the USB host function in the controller 12 and selectively discard (block) only operation data of, for instance, a right-click operation out of mouse operations.

Note that devices in the HID (Human Interface Device) class such as the USB mouse 30-2 and the USB keyboard 30-1 transfer data in a unit called a report. For instance, a mouse returns a report including information such as
X-axis travel,
Y-axis travel,
Direction of travel and amount of travel since the last data output,
Status of buttons (information on whether any one of left, right, or center buttons is pressed), and so forth in response to polling from the USB host function in the controller 12.

In a case where the access right information acquired by the authentication part 11 only permits right-click operations on the mouse, the pass/block control function 122 of the controller 12 analyzes data received from the USB mouse 30-2 via the USB host function in the controller 12. As a result of the analysis,
the pass/block control function 122 may forward (pass) the data to the USB device function in the controller 12 when the status of buttons in a report included in the data indicates that the right button is pressed, or
the pass/block control function 122 may discard (block) the data when the status of buttons in the report included in the data indicates otherwise.

Alternatively, when the authentication part 11 determines that a user belongs to another Group B, the pass/block control function 122 of the controller 12 may permit a click operation on the USB mouse 30-2 on only a specific area on the display screen of the information terminal 20.

At this time, the pass/block control function 122 of the controller 12 may forward (pass) operation signal data of a click operation from the USB mouse 30-2 to the USB device function in the controller 12 only when a mouse cursor (mouse pointer) is positioned on a specific area on the display screen, and block a click operation signal data from the USB mouse 30-2 when the mousse operation takes place outside the specific area. In this case, the pass/block control function 122 of the controller 12 may acquire area information of the display screen and the current position information of the mouse cursor (mouse pointer) from the information terminal 20 in advance, and obtain position information of the mouse cursor (mouse pointer) on the screen by mapping an amount of mouse travel included in the report returned by the USB mouse 30-2 in response to polling from the USB host function of the controller 12 onto a position of the mouse cursor (mouse pointer) on the screen.

Alternatively, when the authentication part 11 determines that a user belongs to yet another Group C, the pass/block control function 122 of the controller 12 may monitor keycodes returned by the USB keyboard 30-1, and block, for instance, input of an Enter key. That is, when data from the USB keyboard 30-1 includes the Enter key at the end of an input keycode sequence, the pass/block control function 122 of the controller 12 may discard the data. Alternatively, the pass/block control function 122 of the controller 12 may delete the Enter key from key input data returned from the USB keyboard 30-1 and forward (pass) the data to the USB device function in the controller 12 as a key input of the USB keyboard 30-1.

Further, the pass/block control function 122 of the controller 12 may record an operation event in a history (log) and generate an appropriate operation event on behalf of the USB device 30 at a timing of an authentication result by the authentication part 11. For instance, when an access right based on an authentication result in the authentication part 11 changes from the access right to pass data from the USB keyboard 30-1 to the access right to block the data, in a state in which a key on the USB keyboard 30-1 is pressed (key-down event occurs) by a user authenticated by the authentication part 11, the pass/block control function 122 of the controller 12 may generate information equivalent to a key-up event for the same key on behalf of the USB keyboard 30-1, for instance, just as the data is blocked, and forward the generated information equivalent to a key-up event for the key to the USB device function in the controller 12.

A PS/2 keyboard sends a key-specific scan code to the CPU (Central Processing Unit) when detecting a key press or release. A scan code generated when a key is pressed is called a "make" code, and one generated when the key is released is called a "break" code. When a keyboard performs auto-repeat processing, a make code is generated periodically while a key is pressed, and a break code is sent when the key is released. A USB keyboard, however, does not tell the USB host which key is released (there is no break code), but sends a state after a key is released in response to polling from the USB host. The USB host determines that the key has been released based on the state transmitted from the USB keyboard.

In the relay apparatus 10, when the pass/block control function 122 of the controller 12 refers to the operation event log just at a timing when the access right of a user determined by the authentication result changes from access permission to the USB keyboard 30-1 to denial access in the authentication part 11 and determines that the keyboard was in a key-down event state until immediately before the timing, the pass/block control function 122 of the controller 12 may generate information equivalent to a key-up event for the key (e.g., data indicating a state in which a different control key (dummy key) is pressed) on behalf of the keyboard and forward the data to the USB device function in the controller 12.

In response to polling from the information terminal 20, the USB device function in the controller 12 returns the data generated by the pass/block control function 122 of the controller 12 in place of the keyboard. The information terminal 20 receives the data and recognizes that the key is released (a key-up event occurs).

Further, the authentication part 11 preferably authenticates a user repeatedly (e.g., once a second).

Figure 8:
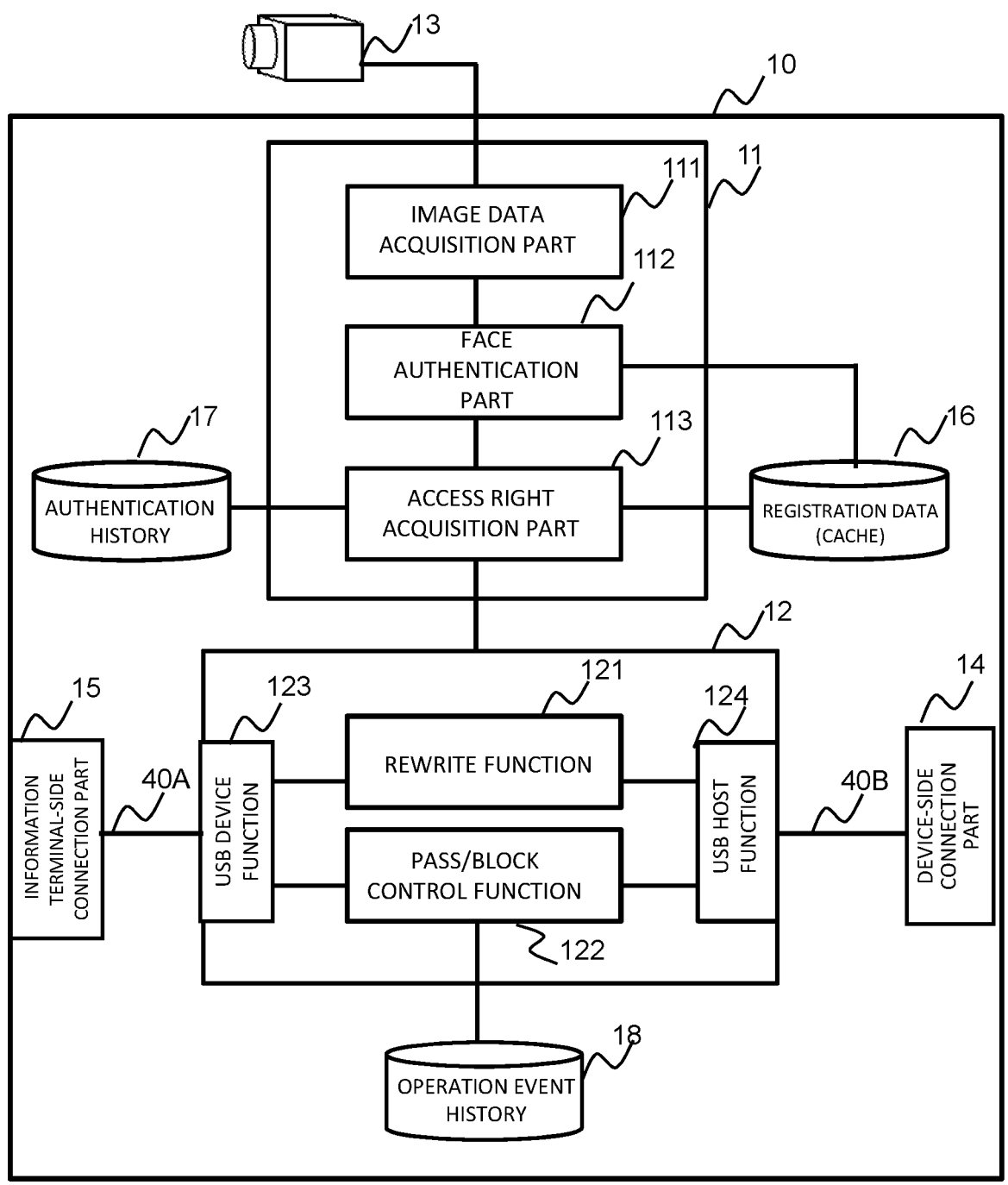
FIG. 8 is a diagram illustrating the first example embodiment of the present invention.

FIG. 8 is a block diagram illustrating functional configurations of the authentication part 11 and the controller 12 illustrated in FIG. 3. The authentication part 11 includes an image data acquisition part 111, a face authentication part 112, and an access right acquisition part 113. The image data acquisition part 111 acquires image data captured by the camera 13. Note that the camera 13 may store image data captured as a moving image in a circular buffer included in the camera 13 and the image data acquisition part 111 may extract, for instance, one frame of image data from the moving image. Alternatively, the image data acquisition part 111 may transmit a capture start command to the camera 13 periodically (e.g., every second) and acquire a still image from the camera 13.

The face authentication part 112 acquires image data (e.g., one frame of image data) from the image data acquisition part 111 and performs face detection from the image data. The face authentication part 112 detects contours (edges) of a face by extracting edges from the image data (one frame of image data), using, for instance, horizontal or vertical filters. Next, the face authentication part 112 extracts a feature value from the detected face image (e.g., eye-to-eye distance may be extracted as a facial feature value).

Then, the face authentication part 112 compares the extracted feature value with face image data (facial features) of each person (e.g., employees, permatemps, outsiders, etc.) in the registration data stored in advance in a registration data storage part 16, calculates a similarity, and determines which registered person matches the user captured by the camera 13. The registration data storage part 16 may be constituted by a semiconductor memory such as a RAM or EEPROM or by a HDD or SSD (Solid State Drive).

When the face authentication of the user is successful, the face authentication part 112 outputs the identification information (ID) of the authenticated user to the access right acquisition part 113.

Based in the identification information (ID) of the user, the face authentication part 112 refers to the registration data (attribute data on employees, etc.) stored in advance in the registration data storage part 16 and extracts the access right information of the user with respect to the information terminal 20 (indicating, for instance, if the user belongs to a group that is permitted to set parameters from the information terminal 20 or to a group that is not permitted to set parameters from the information terminal 20, etc.).

Figure 9A:
FIG. 9A is a drawing showing an example of registration data.
Figure 9A:
Figure 9A:

FIG. 9A schematically shows an example of the registration data 161 stored in the registration data storage part 16. For the sake of simplicity, FIG. 9A shows the following:
Face image data (facial feature value(s))
Employee (user) attribute data (name, department, job title, etc.)
Access right information of the employee (user) or of the group to which the employee (user) belongs as an entry in the registration data 161 stored in the registration data storage part 16, however, the structure of the registration data 161 is not limited to this configuration. For instance, as a matter of course, the face image data (facial feature value(s)), the employee attribute data (department, job title, etc.), and the access right information corresponding to the department and title may be distributed among separate storage devices.

Further, the face image data (facial feature values), the employee attribute data (department, job title, etc.), and the access right information may be stored in a management database not illustrated in the drawing, and when performing face authentication, the authentication part 11 of the relay apparatus 10 may acquire the information from the management database.

Alternatively, the authentication part 11 of the relay apparatus 10 may acquire the information from the management database and hold as a cache, the identification information, the face image data (facial feature value(s)), and the access right information of a successfully authenticated user, in the registration data storage part 16 of the relay apparatus 10. This allows taking advantage of information matching the registration data cached in the registration data storage part 16 in the relay apparatus 10 and contributes to speeding up the face authentication process by skipping access to the management database while the authentication part 11 performs face authentication (e.g., every second) for a user who frequently operates the information terminal 20 or a user who operates the information terminal 20 for a long period of time. The face image data (facial feature values) may be face photographs (digital image data) or data storing facial features therein, or both face photographs and facial features may be stored.

Further, the access right acquisition part 113 may store ID of a successfully authenticated user, date and time information (time stamp), and the access right in an authentication history storage part 17. At this time, if the same user continuously operates the information terminal 20, the access right acquisition part 113 may store the authentication start time and the authentication failure time as a pair linked to the user. The authentication history storage part 17 may be constituted by a semiconductor memory such as a RAM or EEPROM or by a HDD or SSD (Solid State Drive).

Further, with reference to FIG. 8, the controller 12 includes the rewrite function (rewrite part) 121 and the pass/block control function (pass/block control part) 122 described with reference to FIG. 4, the USB device function 123, and the USB host function 124. The pass/block control function (pass/block control part) 122 receives the authentication result from the authentication part 11, and either discards (blocks) data received by the USB host function 124 from the USB device 30 or forwards (passes) the data to the USB device function 123.

A device-side connection part 14 is a physical communication interface such as a USB connector (port). An information terminal-side connection part 15 is a physical interface such as a USB cable.

In response to a request for device information from the information terminal 20, the rewrite function 121 transmits to the information terminal 20 device information in which the device information (the device descriptor, the configuration descriptor, and the interface descriptor) from the USB device 30 is rewritten.

For instance, when the access right of a user authenticated by the authentication part 11 indicate that operation on the USB device 30 is not permitted, the pass/block control function 122 may discard, from the information terminal 20, data returned from the USB device 30 in response to polling from the USB host function 124, and record the polling event of the USB host function 124, date and time (time information), and processing content (discard, etc.) in an operation event history storage part 18. The operation event history storage part 18 may be constituted by a semiconductor memory such as a RAM or EEPROM or by a HDD or SSD (Solid State Drive).

Further, when the pass/block control function 122 discards a data packet from the USB device 30 based on an access right from the authentication part 11, the controller 12 may output an alarm notification (alarm sound, blinking indicator light (red light), etc.) from the alarm device (not illustrated in the drawings).

Similarly, when a person (e.g., an outsider) not authenticated by the authentication part 11 tries to access the information terminal 20 in the step S5 in FIG. 2, the controller 12 may notify an alarm. Note that the alarm device (not illustrated) may be provided in the relay apparatus 10 or arranged externally an outside the relay apparatus 10.

Figure 9B:
FIG. 9B is a drawing showing an example of an authentication history.

FIG. 9B is a diagram illustrating an example of an authentication history 171 stored in the authentication history storage part 17 illustrated in FIG. 8. Referring to FIG. 9B, the authentication history 171 schematically shows a history of an authentication result of a user by the authentication part 11 illustrated in FIG. 4, authentication time, and access right of the user. As authentication time information, the authentication history storage part 17 may store a time period during which the user continues to be authenticated (the time period from the authentication start time until the user is unavailable to be authenticated because he has left his seat).

FIG. 9C is a diagram illustrating an example of the operation event history storage part 18 in which the pass/block control function 122 stores operation events in association with time information. Without being limited thereto, the operation event history 181 stored in the operation event history storage part 18 records a table including the following columns in association with the log number.

Data exchanged between the pass/block control function 122 and the USB host function 124 in the controller 12

Data exchanged between the pass/block control function 122 and the USB device function 123 in the controller 12

Time information (time stamp)

Processing content of data by the pass/block control function 122 the data (pass/discard)

Operation on the USB device 30 (origin of the data) when the pass/block control function 122 analyzes data received from the USB host function in the controller 12 and is able to extract the operation on the USB device 30 that generates the data.

When the pass/block control function 122 discards (blocks) data from the USB device 30, an operation obtained by analyzing the data may be recorded in the "OPERATION ON PERIPHERAL" column of the operation event history 181. In the example of FIG. 9C, the log number N records the fact that data ($DATA_N$) from the USB device 30 includes input of a numeric sequence and an Enter key, and the pass/block control function 122 determines this as a parameter input at the USB device 30 and blocks the data since it exceeds the access right. Further, when the pass/block control function 122 is unable to extract the corresponding operation on the USB device 30 by analyzing the data, this fact may be recorded. The pass/block control function 122 may analyze data from the USB device 30 to extract a corresponding operation on the USB device 30 even when forwarding the data to the USB device function within the controller 12.

In response to an instruction from an administrator or the like, the controller 12 may be configured to collate the operation event history 181 stored in the operation event history storage part 18 with the authentication history 171 stored in the authentication history storage part 17, detect that, for instance, a data packet in response to polling of a transaction N has been discarded and detect that an ID of a user operating at that time is A.

The controller 12 may notify the information terminal 20 or a management server not illustrated of a fact that the pass/block control function 122 has discarded data received from the USB device 30. The example of the operation event history 181 in FIG. 9C indicates that the user A belonging to the browsing group has entered a numeric sequence and the Enter key (entering parameters from the USB keyboard 30-1) and that the relay apparatus 10 has discarded the data.

In a case where the controller 12 is configured to output an alarm notification to the alarm device (not illustrated) of the relay apparatus 10 when discarding data from the USB device 30 based on an access right from the authentication part 11, the alarm notification may include ID information and name of a user and details of the processing on the USB device.

The controller 12 may record content of the alarm notification in association with a discarded packet in the operation event history storage part 18.

The USB devices 30 (the USB keyboard 30-1 and the USB mouse 30-2) are connected to two USB ports of a powered-off relay apparatus 10, and connecting a USB cable from the relay apparatus 10 to a USB port of the information terminal 20 will not power on the USB device function in the controller 12 unless the relay apparatus 10 is powered on. A bus-powered type USB device (USB keyboard 30-1 and USB mouse 30-2) connected to the relay apparatus 10 in a powered off state will not be powered on.

When the relay apparatus 10 connected to a USB port of the information terminal 20 and to which the USB keyboard 30-1 and the USB mouse 30-2 are connected, is powered on, the relay apparatus 10 is in a powered state and a reset between the information terminal 20 and the relay apparatus 10 and a reset between the relay apparatus 10 and the USB devices 30 are performed. The USB host function of the controller 12 in the relay apparatus 10 acquires device information (device descriptor, configuration descriptor, interface descriptor, etc.) from the USB keyboard 30-1 and the USB mouse 30-2, the rewrite function 121 of the controller 12 generates information of a pseudo-composite device having functions of the USB keyboard 30-1 and the USB mouse 30-2 in the procedure as described above, and the USB device function of the controller 12 returns the pseudo-composite device information (device descriptor, configuration descriptor, interface descriptor, etc.) in response to a device information request from the information terminal 20. A product ID field (idProduct) is rewritten in the device descriptor of the pseudo-composite device, the number of interfaces in the configuration descriptor is set to two, and two interface descriptors are created.

Further, connecting a powered-on relay apparatus 10, to which no USB device is connected, to a USB port of the information terminal 20 causes the information terminal 20 to forward a device descriptor request (GET_DESCRIPTOR (DEVICE)) to the relay apparatus 10 after a reset (S13 in FIG. 6). The relay apparatus 10 may not return a device descriptor to the information terminal 20. As a result, the second reset in FIG. 6 (S14 in FIG. 6), the address set request (SET_ADDRESS) (S15 in FIG. 6), and the remaining device descriptor request (GET_DESCRIPTOR (DEVICE)) (S16 in FIG. 6), the configuration descriptor request (GET_DESCRIPTOR (CONFIGURATION)) (S17 in FIG. 6), and the configuration setting request (SET_CONFIGURATION) (S18 in FIG. 6) are omitted. In this case, a device driver for the relay apparatus 10 is not needed in the information terminal 20.

In this situation, when a single USB device 30 is connected to the relay apparatus 10, the USB host function of the controller 12 in the relay apparatus 10 performs a reset between the relay apparatus 10 and the USB device 30 and acquires device information (device descriptor, configuration descriptor, interface descriptor, etc.) from the USB device 30. A reset is performed between the information terminal 20 and the relay apparatus 10, and the USB device function of the controller 12 in the relay apparatus 10 returns device information of a pseudo-single USB device 30 to the information terminal 20 in response to a device information request from the information terminal 20.

Then, when another USB device 30 is connected to the relay apparatus 10, the relay apparatus 10 may perform a reset again, acquire device information (device descriptors, configuration descriptors, interface descriptors, etc.) from the plurality of USB devices 30, and return a rewritten device descriptor (the product ID field: idProduct) with the plurality of USB devices 30 treated as one pseudo-composite USB device, two as the number of interfaces in the configuration descriptor, and two interface descriptors created in response to a device information request from the information terminal 20.

In the example described above, the relay apparatus 10 is self-powered, however, when the USB device 30, which is a peripheral device connected to the relay apparatus 10, has a relatively low current consumption, as a mouse and keyboard do, the relay apparatus 10 may be configured as a bus-powered type that receives power (e.g., current of 500 mA (milliampere) and power of 2.5 W per USB port) from a USB port of the information terminal 20. In this case, the storage parts 16, 17, and 18 illustrated in FIG. 8 may be constituted by, for instance, EEPROMs, rather than HDDs, in view of current consumption (power consumption).

In a case where the relay apparatus 10 is of a bus-powered type, connecting a USB cable from the relay apparatus 10 to a USB port of the information terminal 20 powers on the relay apparatus 10. Note that the relay apparatus 10 does not return a device descriptor thereof in response to a device descriptor request from the information terminal 20 after a reset. The procedure after connecting the USB device 30 to the powered-on relay apparatus 10 is the same as the one after connecting the USB device 30 to a (powered-on) self-powered type relay apparatus 10 connected to a USB port of the information terminal 20.

In the case where the relay apparatus 10 is of a bus-powered type, connecting a USB cable from the relay apparatus 10 having a plurality of bus-powered type USB devices 30 (the USB keyboard 30-1 and the USB mouse 30-2) connected to USB ports thereof to a USB port of the information terminal 20 powers on the relay apparatus 10. Again, in this case, the USB host function of the controller 12 in the relay apparatus acquires device information (device descriptors, configuration descriptors, interface descriptors, etc.) from the USB devices 30 (the USB keyboard 30-1 and the USB mouse 30-2), and the USB device function of the controller 12 in the relay apparatus 10 returns to the information terminal 20 a device information of a pseudo-composite USB device in response to a device information request from the information terminal 20.

Figure 10A:
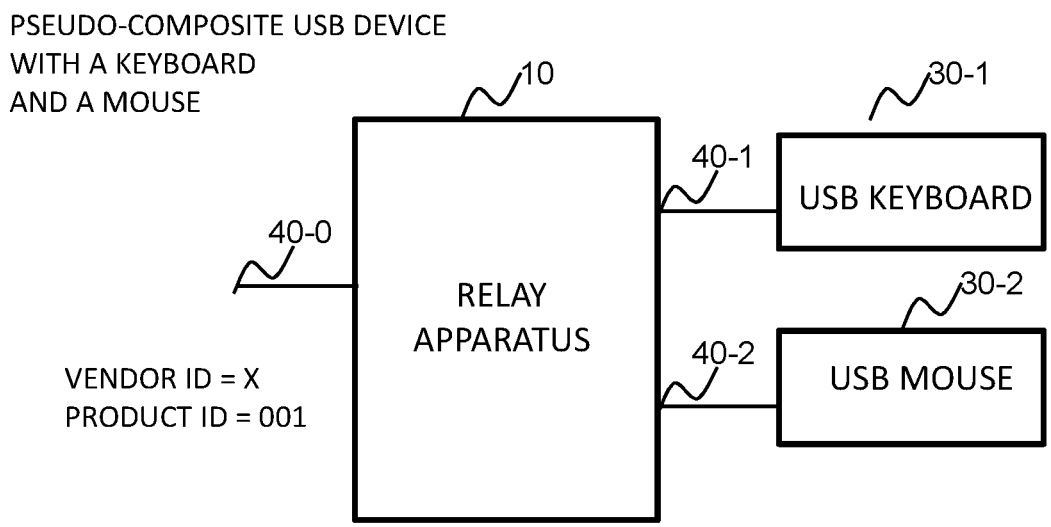
FIG. 10A is a diagram illustrating the first example embodiment of the present invention.
Figure 10B:
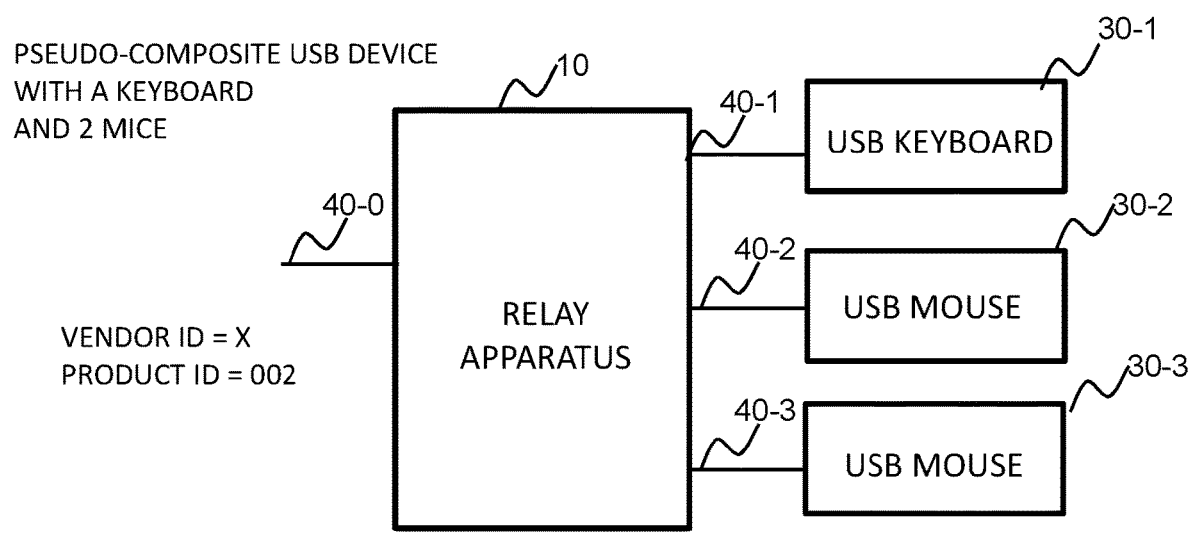
FIG. 10B is a diagram illustrating the first example embodiment of the present invention.

FIGS. 10A and 10B are diagrams illustrating pseudo-composite USB devices with different configurations. FIG. 10A shows a USB keyboard 30-1 and a USB mouse 30-2 as a single pseudo-composite device, and FIG. 10B shows a set of a USB keyboard 30-1 and two USB mice 30-2 and 30-3 as a single pseudo-composite USB device. In FIGS. 10A and 10B, product IDs set in the device descriptors by the relay apparatus 10 are different from each other. Note that OS activates one mouse driver for the two USB mice 30-2 and 30-3. As a result, there is only one mouse pointer on a screen for the two mouses, wherein operations on the two mouses become one mouse operation.

Figure 11A:
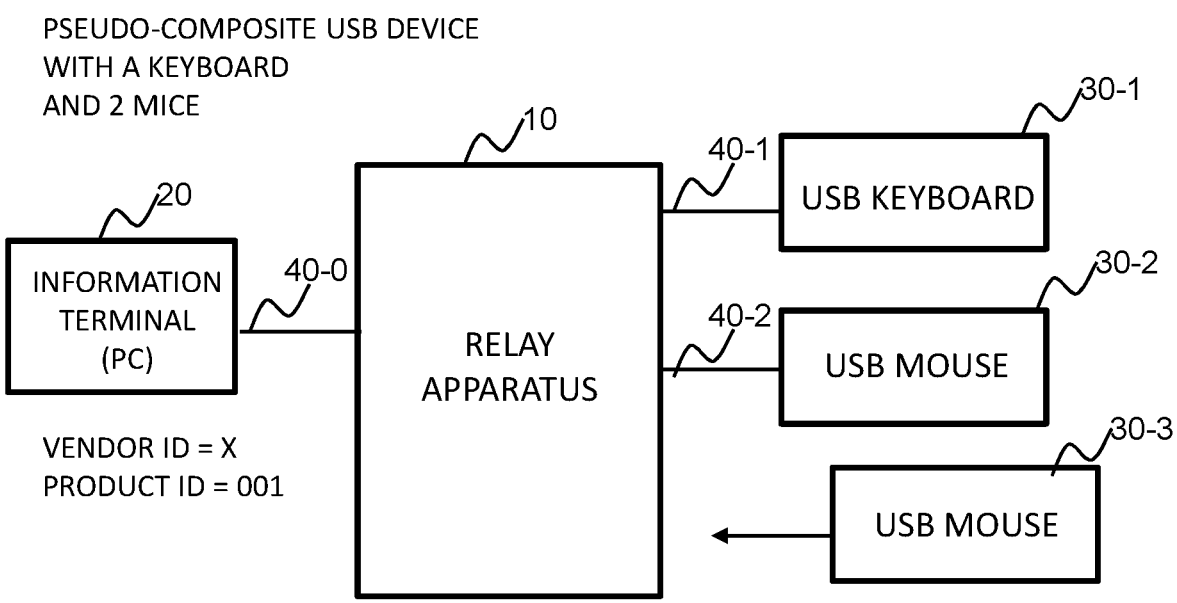
FIG. 11A is a diagram illustrating the first example embodiment of the present invention.
Figure 11B:
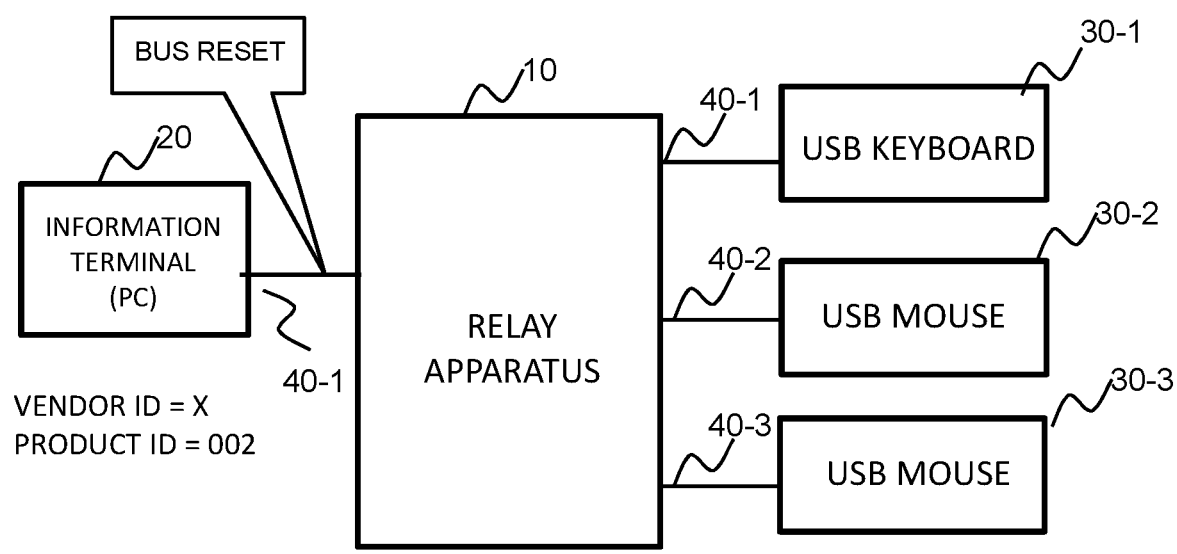
FIG. 11B is a diagram illustrating the first example embodiment of the present invention.

FIG. 11B is a diagram illustrating a case where a separate USB device (USB mouse) 30-3 is newly connected to the relay apparatus 10 to which the USB keyboard 30-1 and the USB mouse 30-2 are connected (FIG. 11A). It is assumed that the relay apparatus 10 has configured the device descriptor, configuration descriptor, etc., for the USB keyboard 30-1 and the USB mouse 30-2, as a single pseudo-composite USB device (Product ID=001).

In this situation, connecting the USB mouse 30-3 to the relay apparatus 10 causes the USB host function in the controller 12 to reset the USB bus between the relay apparatus 10 and the USB devices 30, acquire the device information of the USB devices 30 (the USB keyboard 30-1 and the USB mice 30-2 and 30-3), and generate pseudo device information of a single pseudo-composite USB device having the functions of the USB keyboard 30-1 and the USB mice 30-2 and 30-3. For instance, the rewrite function 121 of the controller 12 generates a device descriptor (Process ID=002), a configuration (the number of interfaces=3), and three interface descriptors as the pseudo device information, which the controller 12 transmits to the information terminal 20 in response to a device information request therefrom. The information terminal 20 activates a device driver corresponding to the device descriptor (Process ID=002).

When the USB mouse 30-3 is disconnected from the relay apparatus 10 in the configuration of FIG. 11B, a bus reset is performed, and the device information is rewritten for a single pseudo-composite USB device constituted by the USB keyboard 30-1 and the USB mouse 30-2. In other words, the rewrite function 121 of the controller 12 configures a device descriptor (Process ID=001) and a configuration (the number of interfaces=2).

Figure 12:
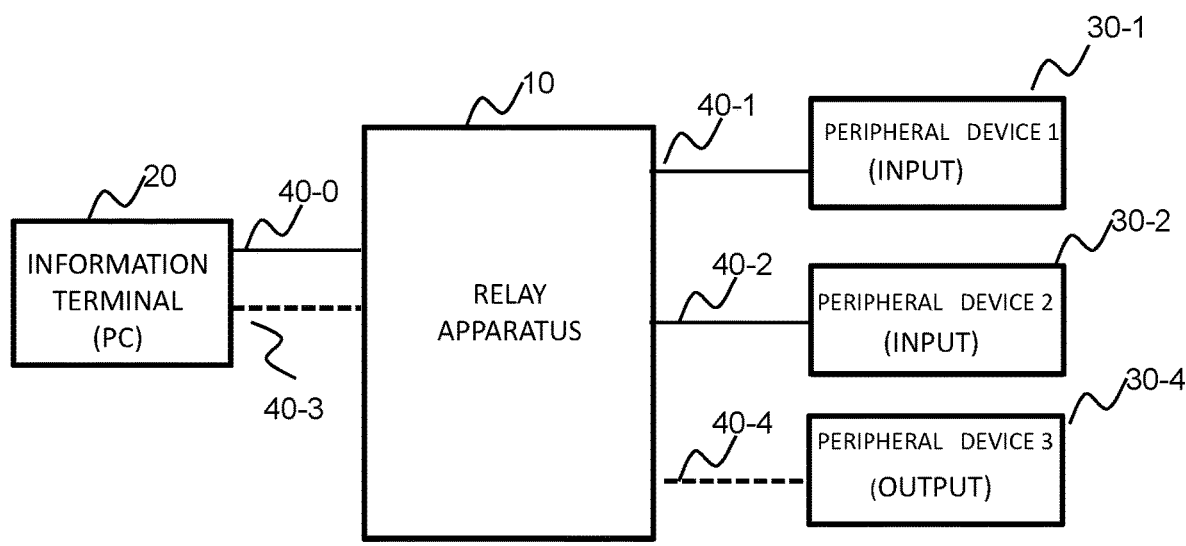
FIG. 12 is a diagram illustrating the first example embodiment of the present invention.

FIG. 12 is a diagram illustrating a configuration in which, from the viewpoint of the information terminal 20, input devices (the peripheral devices 30-1 and 30-2) and an output device (a peripheral device 30-4) are connected as the peripheral devices 30 in the configuration of FIG. 1B. The communication interfaces 40-0 and 40-2 and the communication interfaces 40-3 and 40-4 may be different interfaces.

The output device (the peripheral device 30-4) may, as a matter of course, be a USB device in FIG. 12. In this case, in FIG. 8, the pass/block control function 122 in the controller 12 forwards (passes) data from the information terminal 20 received by the USB device function 123 in the controller 12 to the USB host function 124 in the controller 12 or discards (blocks) the data based on the authentication result in the authentication part 11. When the authentication result (the access right) in the authentication part 11 permits access, the USB host function 124 in the controller 12 transmits an OUT token packet and then a data packet to the output device (the USB device 30-4) with respect to the data received from the pass/block control function 122 (refer to FIG. 8). Further, when the peripheral device (30-4) is a USB output device in FIG. 12, a bulk transfer mode may be used between the USB host and the USB device. Alternatively, for an USB output device that requires continuous and real-time transfers, an isochronous transfer may be used.

Figure 13A:
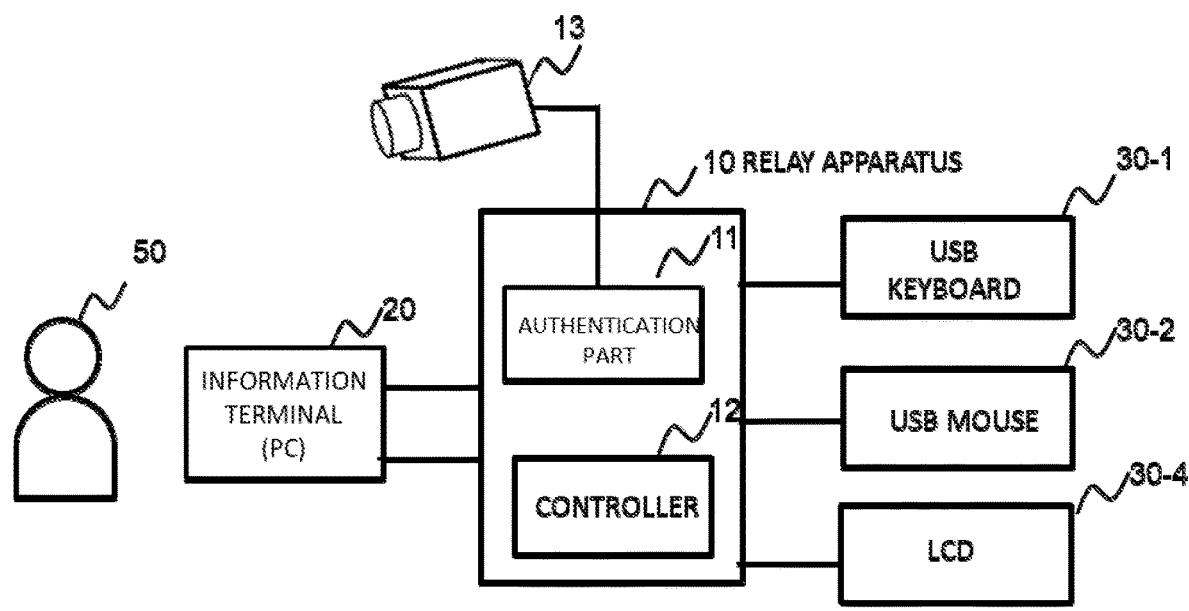
FIG. 13A is a diagram illustrating a variation of the first example embodiment of the present invention.

FIG. 13A is a diagram illustrating an example of a configuration in which, for instance, an LCD (Liquid Crystal Display) device is connected as the peripheral device 30-4 illustrated in FIG. 11. The LCD device 30-4 may be a USB display or a display utilizing a different interface.

The controller 12 of the relay apparatus 10 may have the relay apparatus 10 capture video information transmitted from the information terminal 20 to the LCD device 30-4, and variably control content or brightness of video displayed on the LCD device 30-4 according to the access right information of the user acquired by the authentication part 11. For instance, the controller 12 may analyze video information from the information terminal 20 and does not display information (display with solid black) related to predetermined keywords according to the access right based on the department, job title, etc., of the user.

As illustrated in FIG. 13A, video output from a display part (LCD 21) of the information terminal 20 may be split and supplied to the relay apparatus 10 by a distributor 22, and input from the USB keyboard 30-1 and the USB mouse 30-2 may be controlled based on the access right identified by the authentication part 11. The interface between the relay apparatus 10 and the distributor 22 may be, for instance, VGA (Video Graphics Array), DVI (Digital Visual Interface), HDMI (High-Definition Multimedia Interface (registered trademark)), etc.

Figure 13B:
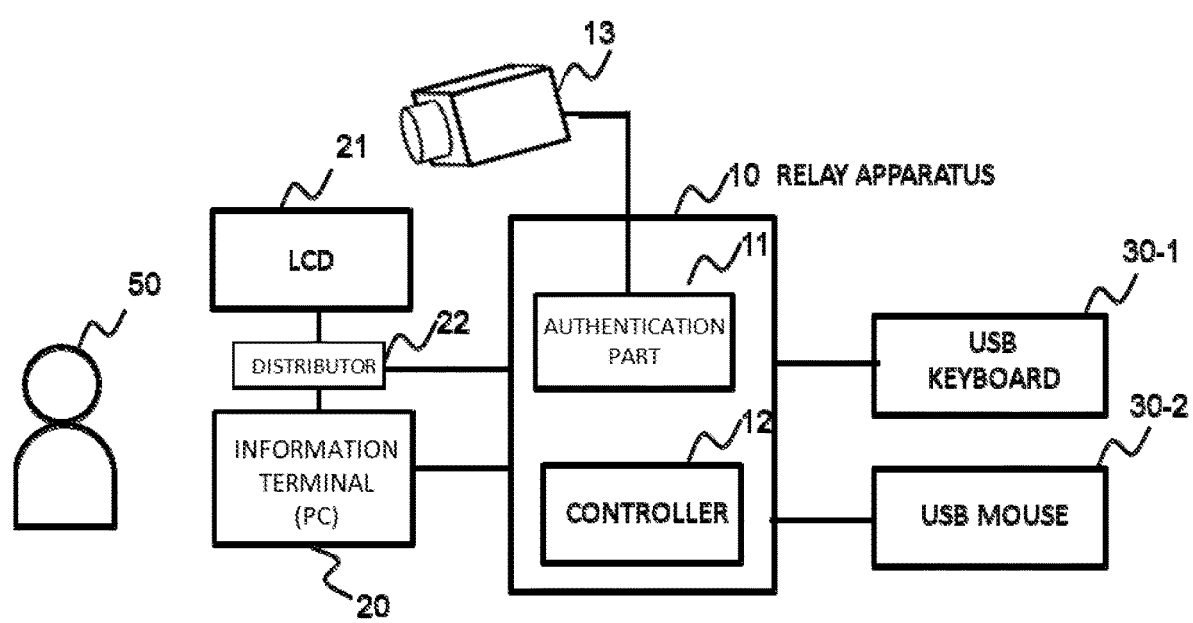
FIG. 13B is a diagram illustrating a variation of the first example embodiment of the present invention.
Figure 14A:
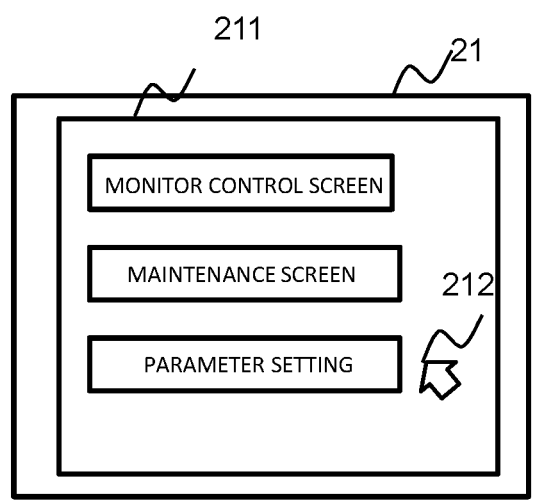
FIG. 14A is a diagram illustrating a variation of the first example embodiment of the present invention.
Figure 14B:
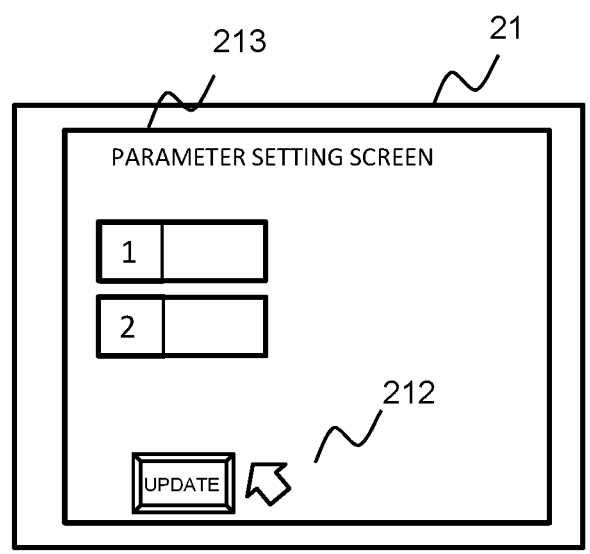
FIG. 14B is a diagram illustrating a variation of the first example embodiment of the present invention.

FIGS. 14A and 14B are diagrams illustrating an example of control by the relay apparatus 10 in FIG. 13B. The relay apparatus 10 receives the video output from the display part (LCD 21) of the information terminal 20 and generates (updates) screen (frame) information. On a screen illustrated in FIG. 14A, the controller 12 may perform pattern recognition of the shape of a mouse point (mouse cursor) 212. When the "PARAMETER SETTING" screen is selected on the screen displayed on the display part (LCD 21) of the information terminal 20 as illustrated in FIG. 14A, the screen is updated to the one illustrated in FIG. 14B. When the user does not have an access right to parameter setting and the mouse pointer (mouse cursor) 212 is positioned on an UPDATE button, the input from the USB mouse 30-2 may be blocked and the screen (video signal) of the display part (LCD 21) of the information terminal 20 may be turned off (video information is not displayed on the screen).

In a second example embodiment, some functions of the relay apparatus 10 of the first example embodiment are implemented as a part of functions of a USB hub. For instance, a system configuration of the second example embodiment is the same as the configuration described with reference to FIG. 1B and FIG. 3. Further, the operation of controlling a user's access to the peripheral device 30 in the relay apparatus 10 according to the second example embodiment is basically the same as the operation described with reference to FIG. 2.

Figure 15:
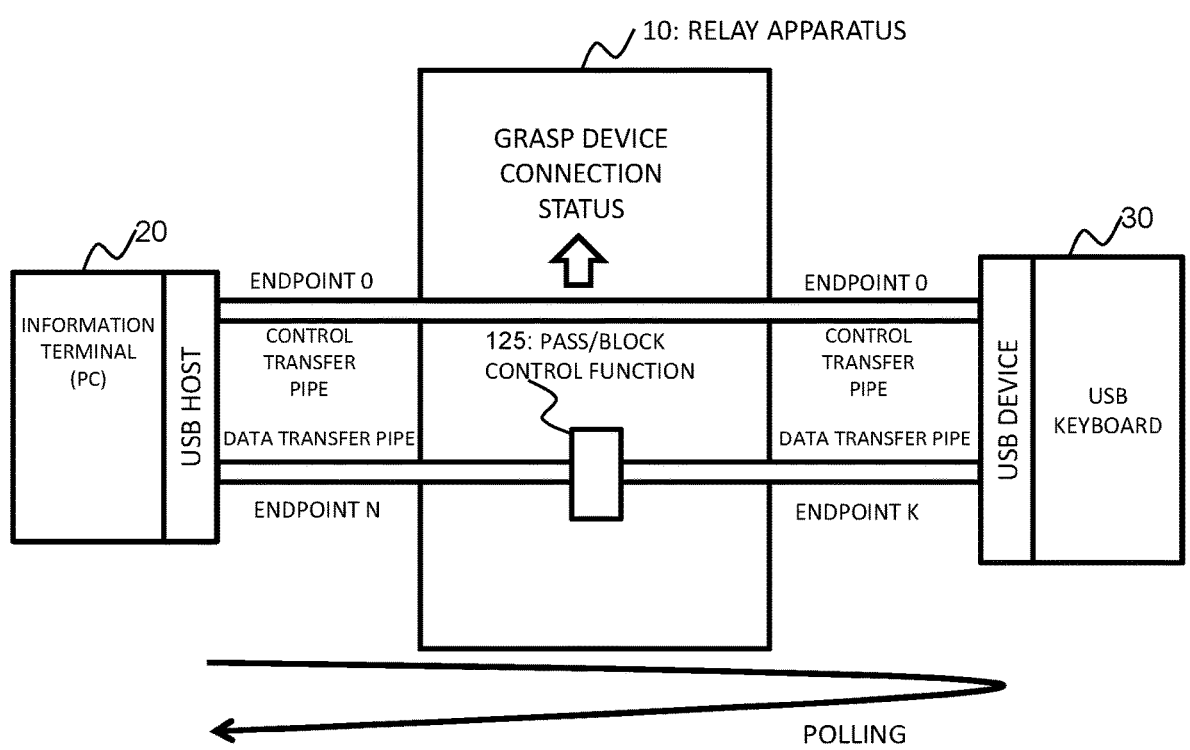
FIG. 15 is a diagram illustrating a second example embodiment of the present invention.

FIG. 15 is a diagram illustrating the second example embodiment and corresponds to FIG. 4 used in the description of the first example embodiment. In the second example embodiment, the controller 12 is configured to be able to inspect details of a control transfer and find what kind of a USB device is connected (what device is connected to which data transfer pipe). The relay apparatus 10 does not rewrite the device connection information of a USB device (e.g., the device descriptor, etc.).

The relay apparatus 10 of FIG. 15 do not aggregate a plurality of USB devices 30 connected to the relay apparatus 10 into a single pseudo-composite device, and a vendor ID, a product ID, etc., in the device descriptor from each USB device 30 are directly forwarded to the information terminal 20. In other words, a device descriptor request, configuration descriptor request, and address set request (requests through a control transfer) from the information terminal 20 are directly forwarded to the USB devices 30 via the controller 12 of the relay apparatus 10, and a data packet (each descriptor) from the USB devices in response to each request is also directly forwarded to the information terminal 20.

Further, the pass/block control function 125 passes/blocks data in a data transfer pipe (rewriting polling data) according to the authentication result.

The relay apparatus 10 is transparent as seen from the information terminal 20. For instance, a data inquiry (polling; IN token packet) or an OUT token packet from the information terminal 20 to the USB device 30 may be directly forwarded to the USB device 30.

The pass/block control function 125 of the controller 12 may discard a data packet returned from the USB device 30 in response to a data inquiry (polling; IN token packet) from the information terminal 20 to the USB device 30, when, for instance, an access right of a currently authenticated user do not permit any operation on the USB device 30, based on an authentication result of the authentication part 11.

Further, the pass/block control function 125 of the controller 12 may control to discard an IN token packet (polling) or OUT token packet from the information terminal 20 to the USB device 30, when, for instance, the access right of a currently authenticated user do not permit any operation on the USB device 30 based on an authentication result of the authentication part 11.

Alternatively, the pass/block control function 125 of the controller 12 may return, for instance, STALL (device inoperable) to the information terminal 20 in response to polling (IN token packet) from the information terminal 20.

Further, the pass/block control function 125 of the controller 12 may record each transaction in the operation event history. In the operation event history, the pass/block control function 125 may record the following as a not-limiting example.

IN token packet or OUT token packet from the information terminal 20,
Date and time information (time stamp),
Data packet returned from the USB device 30 in response to polling,
Processing content of a data packet by the pass/block control function 125 such as passing, discarding, or returning a handshake packet STALL, and
Operation at the USB device 30 obtained by analyzing data returned from the USB device 30.

The pass/block control function 125 may analyze data and perform, for instance, the following control (without being limited thereto) when an authentication result of the authentication part 11 do not permit a specific operation of the USB device 30 by a user and the controller 12 receives polling from the information terminal 20 (receiving a IN token packet).
Return a data packet including data to the information terminal 20, when the data does not correspond to an operation not permitted
Rewrite and return data to the information terminal 20 when the data includes information (code) that corresponds to an operation not permitted
Return STALL (device inoperable) as a handshake packet for the IN token packet from the information terminal 20 or return nothing in response to the IN token packet from the information terminal 20, when the data includes information (code) that corresponds to the operation not permitted Further, when an authentication result of the authentication part 11 do not permit a user to browse information on a USB device 30 (e.g., an output device such as a display device), the pass/block control function 125 of the controller 12 may discard a data packet following an OUT token packet from the information terminal 20 to the USB device 30. Alternatively, the pass/block control function 125 of the controller 12 may perform blur filtering processing on data displayed on the USB device 30 (e.g., a display device) and transmit the data to the USB device 30 (e.g., a display device) so that it is impossible or hard for the user to recognize or see the screen.

Figure 16:
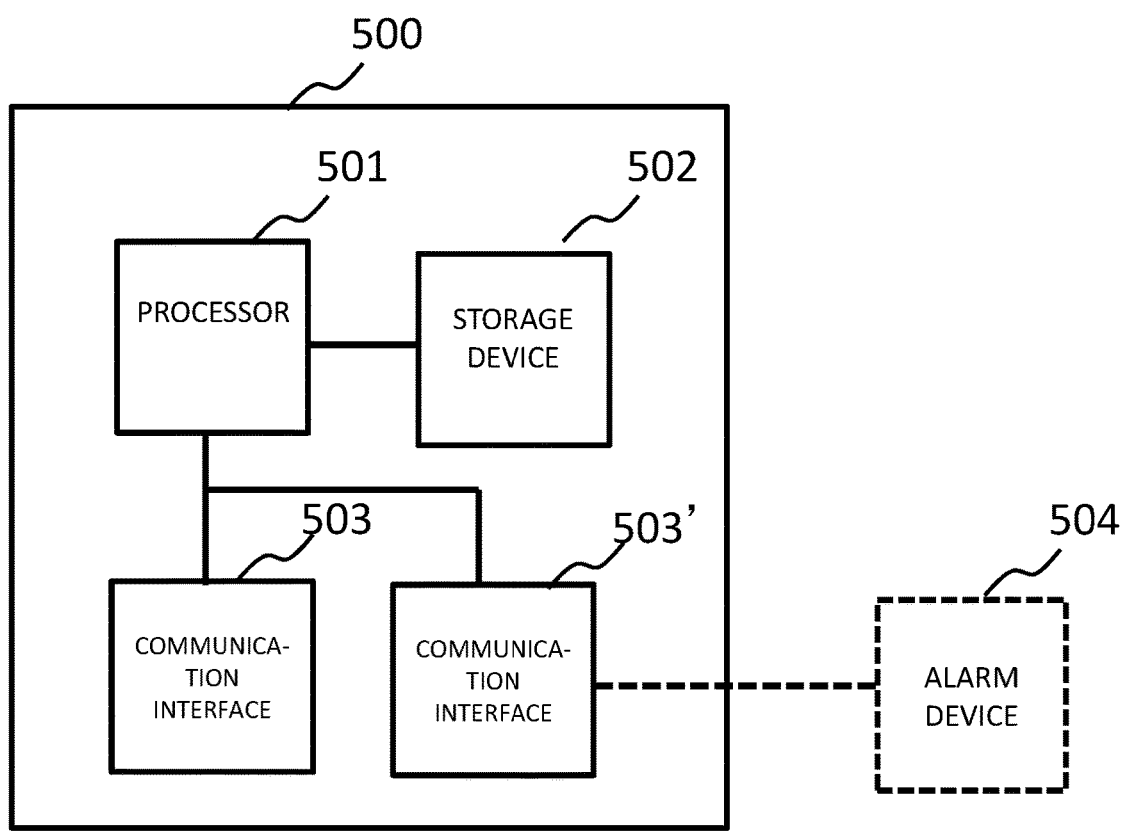
FIG. 16 is a diagram illustrating a third example embodiment of the present invention.

As illustrated in FIG. 16, the relay apparatus 10 described in the example embodiments may be implemented in a computer apparatus 500. Referring to FIG. 16, the computer apparatus 500 includes a processor (CPU (Central Processing Unit); data processing apparatus) 501, a storage apparatus 502 that includes at least one of a semiconductor memory (e.g., RAM (Random Access Memory), ROM (Read Only Memory) or EEPROM (Electrically Erasable and Programmable ROM), etc.), HDD (Hard Disk Drive), CD (Compact Disc), and DVD (Digital Versatile Disc), and a communication interface 503. The functions of the authentication part 11 and the controller 12 in the relay apparatus 10 in the above described example embodiments may be realized by executing a program stored in the storage apparatus 502. The communication interface 503 includes the communication interface 40-0 illustrated in FIG. 1B.

Further, in FIG. 16, the computer apparatus 500 may be configured to comprise a display apparatus(such as an LED (Light Emitting Diode) display device for alarm notification) connected to the processor 501, or the communication interface 503 may include a communication interface such as a NIC (Network Interface Card) that connects to such an external display apparatus. Alternatively, in FIG. 14, the computer apparatus 500 may be configured to include an alarm device (speaker device that generates an alarm sound; not illustrated in the drawing) connected to the processor 501 or include a communication interface 503' such as a NIC that connects to an external alarm device 504 (speaker device that generates an alarm sound, indicator light, etc.) Further, the communication interface 503 may be configured to include a communication interface such as a NIC that connects to a management database that manages employee data.

A variation of the above described example embodiments may be an employee card (e.g., RFID (Radio Frequency Identifier) card or tag) carried by a user (employee) at work. In this variation, face image data of a user, a user ID, a department, a job title, and access right information may be stored in advance in the employee card (RFID card), and the authentication part 11 may read registration data from the employee card (RFID card) using a RFID reader, collate the face image of a user captured by the camera 13 with the registration data, determine the identity of the user when they match, and output access right information to the controller 12. Alternatively, a biometric authentication method (e.g., iris authentication) other than face recognition may be used.

Further, as a matter of course, the communication interface in the above described example embodiments is not limited to USB. For instance, the communication interface may be a wireless LAN (Local Area Network) using Bluetooth (registered trademark), and the peripheral devices 30 such as a keyboard, mouse, and LCD may be a Bluetooth keyboard, Bluetooth mouse, and Bluetooth display.

Further, the disclosure of Patent Literature 1 cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual examples, and the individual elements of the individual figures) within the scope of the Claims of the present invention. That is, it is self-explanatory that the present invention includes any types of variations and modifications to be done by a skilled person according to the whole disclosure including the Claims, and the technical concept of the present invention.

The example embodiments may be described as (but not limited to) the following Supplementary Notes.

Supplementary Note 1

An operation authentication relay apparatus connected between an information terminal and at least one peripheral device communicatively connected to the information terminal, wherein
the operation authentication relay apparatus is recognized as a peripheral device by the information terminal,
the operation authentication relay apparatus is recognized as an information terminal by the peripheral device, and
the operation authentication relay apparatus comprises:
authentication means for authenticating a user using the information terminal by operating the peripheral device; and
control means for controlling relaying of a signal between the peripheral device and the information terminal, based on an authentication result of the user by the authentication means.

Supplementary Note 2

The operation authentication relay apparatus according to Supplementary Note 1, wherein the operation authentication relay apparatus connected to a plurality of peripheral devices is recognized by the information terminal as a single composite peripheral device having the functions of the plurality of peripheral devices.

Supplementary Note 3

The operation authentication relay apparatus according to Supplementary Note 1 or 2, wherein the control means passes or blocks an operation event that the peripheral device transmits/receives to/from the information terminal via a communication interface based on the attribute of the user which is an authentication result by the authentication means.

Supplementary Note 4

The operation authentication relay apparatus according to any one of Supplementary Notes 1 to 3, wherein the control means further passes or blocks an operation event that the peripheral device transmits/receives to/from the information terminal via a communication interface according to a combination of the authentication result, the type of the peripheral device, and the operation event.

Supplementary Note 5

The operation authentication relay apparatus according to any one of Supplementary Notes 1 to 4, wherein the control means stores an operation event between the information terminal and the peripheral device in a storage part.

Supplementary Note 6

The operation authentication relay apparatus according to any one of Supplementary Notes 1 to 5 generating an operation event in place of the peripheral device and transmitting the generated operation event to the information terminal based on the authentication result from the authentication means, or at the output timing of the authentication result from the authentication means.

Supplementary Note 7

The operation authentication relay apparatus according to Supplementary Note 5 or 6, wherein
the authentication means stores an authentication history of the user in a storage part, and
the control means extracts operation content performed by the user on the peripheral device by collating the authentication history of the user with a history of the operation events.

Supplementary Note 8

The operation authentication relay apparatus according to any one of Supplementary Notes 1 to 7, wherein
the authentication means identifies access right information associated with the user, based on a result of biometric authentication of the user, and
the control means controls signal transfer between the information terminal and the peripheral device operated by the user, based on the access right information associated with the user.

Supplementary Note 9

The operation authentication relay apparatus according to any one of Supplementary Notes 1 to 8, wherein the control means at least either invalidates an operation on the peripheral device exceeding the access right information of the user or generates warning when detecting such an operation.

Supplementary Note 10

The operation authentication relay apparatus according to any one of Supplementary Notes 1 to 9, wherein the peripheral devices include a display device and an input device, and the control means controls information displayed on a screen of the display device and input from the screen of the display device by the input device, based on the access right information of the user.

Supplementary Note 11

The operation authentication relay apparatus according to any one of Supplementary Notes 1 to 10, wherein the authentication means performs authentication repeatedly at a predetermined time interval.

Supplementary Note 12

The operation authentication relay apparatus according to any one of Supplementary Notes 1 to 11, wherein the control means rewrites device identification information on a control plane so that a plurality of peripheral devices connected to the relay apparatus are seen as a single peripheral device from the information terminal and notifies the information terminal of the device identification information rewritten.

Supplementary Note 13

The operation authentication relay apparatus according to any one of Supplementary Notes 1 to 12, wherein, with respect to a plurality of peripheral devices for which the device identification information is rewritten so that the plurality of peripheral devices are seen as a single peripheral device from the information terminal, the control means notifies the information terminal of device identification information different from the original device identification information when the types of devices constituting the plurality of peripheral devices are different.

Supplementary Note 14

The operation authentication relay apparatus according to any one of Supplementary Notes 1 to 13, wherein, when a combination of one or more peripheral devices connected to the relay apparatus is changed, the control means controls to cause the information terminal to execute device identification processing again after resetting the communication interface to the information terminal.

Supplementary Note 15

An operation authentication relay apparatus to which a plurality of peripheral devices communicatively connected to an information terminal can be connected and including a hub (e.g., a USB hub) that relays communication between the peripheral devices and the information terminal, the operation authentication relay apparatus comprising:
authentication means for authenticating a user using the information terminal by operating the peripheral device; and
control means for controlling relaying of a signal between the peripheral device and the information terminal, based on an authentication result of the user by the authentication means.

Supplementary Note 16

The operation authentication relay apparatus according to Supplementary Note 15, wherein the control means passes or blocks an operation event that the peripheral device transmits/receives to/from the information terminal via a communication interface based on the attribute of the user which is an authentication result by the authentication means.

Supplementary Note 17

The operation authentication relay apparatus according to Supplementary Note 15 or 16, wherein the control means further passes or blocks an operation event that the peripheral device transmits/receives to/from the information terminal via a communication interface according to a combination of the authentication result, the type of the peripheral device, and the operation event.

Supplementary Note 18

The operation authentication relay apparatus according to any one of Supplementary Notes 15 to 17, wherein the control means stores an operation event between the information terminal and the peripheral device in a storage part.

Supplementary Note 19

The operation authentication relay apparatus according to any one of Supplementary Notes 15 to 18 generating an operation event in place of the peripheral device and transmitting the generated operation event to the information terminal based on the authentication result from the authentication means, or at the output timing of the authentication result from the authentication means.

Supplementary Note 20

The operation authentication relay apparatus according to Supplementary Note 18 or 19, wherein
the authentication means stores an authentication history of the user in a storage part, and
the control means extracts operation content performed by the user on the peripheral device by collating the authentication history of the user with a history of the operation events.

Supplementary Note 21

The operation authentication relay apparatus according to any one of Supplementary Notes 15 to 20, wherein
the authentication means identifies access right information associated with the user, based on a result of biometric authentication of the user, and
the control means controls signal transfer between the information terminal and the peripheral device operated by the user, based on the access right information associated with the user.

Supplementary Note 22

The operation authentication relay apparatus according to any one of Supplementary Notes 15 to 21, wherein the control means at least either invalidates an operation on the peripheral device exceeding the access right information of the user or generates warning when detecting such an operation.

Supplementary Note 23

The operation authentication relay apparatus according to any one of Supplementary Notes 15 to 22, wherein the peripheral devices include a display device and an input device, and the control means controls information displayed on a screen of the display device and input from the screen of the display device by the input device, based on the access right information of the user.

Supplementary Note 24

The operation authentication relay apparatus according to any one of Supplementary Notes 15 to 23, wherein the authentication means performs authentication repeatedly at a predetermined time interval.

Supplementary Note 25

An operation authentication relay method of a relay apparatus connected between an information terminal and at least one peripheral device communicatively connected to the information terminal and supplying information to the information terminal, the operation authentication relay method including:

being recognized as a peripheral device by the information terminal;

being recognized as an information terminal by the peripheral device;

authenticating a user using the information terminal by operating the peripheral device; and controlling relaying of an operation signal of the peripheral device by the user to the information terminal, based on an authentication result of the user.

Supplementary Note 26

The operation authentication relay method according to Supplementary Note 25, wherein the operation authentication relay apparatus connected to a plurality of peripheral devices is recognized by the information terminal as a single composite peripheral device having the functions of the plurality of peripheral devices.

Supplementary Note 27

The operation authentication relay method according to Supplementary Note 25 or 26 allowing or blocking an operation event that the peripheral device transmits/receives to/from the information terminal via a communication interface based on the attribute of the user which is an authentication result.

Supplementary Note 28

The operation authentication relay method according to any one of Supplementary Notes 25 to 27 further allowing or blocking an operation event that the peripheral device transmits/receives to/from the information terminal via a communication interface according to a combination of the authentication result, the type of the peripheral device, and the operation event.

Supplementary Note 29

The operation authentication relay method according to any one of Supplementary Notes 25 to 28 storing an operation event between the information terminal and the peripheral device in a storage part.

Supplementary Note 30

The operation authentication relay method according to any one of Supplementary Notes 25 to 29 generating an operation event in place of the peripheral device and transmitting the generated operation event to the information terminal based on the authentication result, or at the output timing of the authentication result.

Supplementary Note 31

The operation authentication relay method according to Supplementary Note 29 or 30 storing an authentication history of the user in a storage part and extracting operation content performed by the user on the peripheral device by collating the authentication history of the user with a history of the operation events.

Supplementary Note 32

The operation authentication relay method according to any one of Supplementary Notes 25 to 31 identifying access right information associated with the user, based on a result of biometric authentication of the user and controlling signal transfer between the information terminal and the peripheral device operated by the user, based on the access right information associated with the user.

Supplementary Note 33

The operation authentication relay method according to any one of Supplementary Notes 25 to 32 either disabling an operation on the peripheral device exceeding the access right information of the user or giving a warning when detecting such an operation.

Supplementary Note 34

The operation authentication relay method according to any one of Supplementary Notes 25 to 33 having the peripheral device include a display device and an input device and controlling information displayed on a screen of the display device and input from the screen of the display device by the input device, based on the access right information of the user.

Supplementary Note 35

The operation authentication relay method according to any one of Supplementary Notes 25 to 34 performing authentication repeatedly at a predetermined time interval.

Supplementary Note 36

The operation authentication relay method according to any one of Supplementary Notes 25 to 35 rewriting the device identification information on a control plane so that a plurality of peripheral devices connected to the relay apparatus are seen as a single peripheral device from the information terminal and notifying the information terminal of the rewritten device identification information.

Supplementary Note 37

The operation authentication relay method according to any one of Supplementary Notes 25 to 36 notifying the information terminal of device identification information different from the original device identification information when the types of devices constituting a plurality of peripheral devices are different with respect to the plurality of peripheral devices for which the device identification information is rewritten so that the plurality of peripheral devices are seen as a single peripheral device from the information terminal.

Supplementary Note 38

The operation authentication relay method according to any one of Supplementary Notes 25 to 37 controlling to cause the information terminal to execute device identification processing again after resetting the communication interface to the information terminal when a combination of one or more peripheral devices connected to the relay apparatus is changed.

Supplementary Note 39

An operation authentication relay method of a hub function to which a plurality of peripheral devices communicatively connected to an information terminal can be connected and that relays communication between the peripheral devices and the information terminal, the operation authentication relay method including:

authenticating a user using the information terminal by operating the peripheral device; and controlling relaying of a signal between the peripheral device and the information terminal, based on an authentication result of the user by the authentication means.

Supplementary Note 40

A program causing a computer constituting an operation authentication relay apparatus connected between an information terminal and at least one peripheral device communicatively connected to the information terminal and supplying information to the information terminal to execute processing comprising:

controlling the operation authentication relay apparatus to be recognized as a peripheral device by the information terminal and to be recognized as an information terminal by the peripheral device;

authenticating a user using the information terminal by operating the peripheral device; and control processing for controlling relaying of an operation signal of the peripheral device by the user to the information terminal, based on an authentication result of the user.

Supplementary Note 41

The program according to Supplementary Note 40 causing the computer to execute controlling the operation authentication relay apparatus connected to a plurality of peripheral devices to be recognized by the information terminal as a single composite peripheral device having the functions of the plurality of peripheral devices.

Supplementary Note 42

The program according to Supplementary Note 40 or 41, wherein the control processing passes or blocks an operation event that the peripheral device transmits/receives to/from the information terminal via a communication interface based on the attribute of the user which is an authentication result in the authentication process.

Supplementary Note 43

The program according to any one of Supplementary Notes 40 to 42, wherein the control processing further passes or blocks an operation event that the peripheral device transmits/receives to/from the information terminal via a communication interface according to a combination of the authentication result, the type of the peripheral device, and the operation event.

Supplementary Note 44

The program according to any one of Supplementary Notes 40 to 43, wherein the control processing stores an operation event between the information terminal and the peripheral device in a storage part.

Supplementary Note 45

The program according to any one of Supplementary Notes 40 to 44 generating an operation event in place of the peripheral device and transmitting the generated operation event to the information terminal based on the authentication result in the authentication process, or at the output timing of the authentication result in the authentication process.

Supplementary Note 46

The program according to Supplementary Note 44 or 45, wherein the authentication processing stores an authentication history of the user in a storage part, and the control processing extracts operation content performed by the user on the peripheral device by collating the authentication history of the user with a history of the operation events.

Supplementary Note 47

The program according to any one of Supplementary Notes 40 to 46, wherein the authentication processing identifies access right information associated with the user, based on a result of biometric authentication of the user, and the control processing controls signal transfer between the information terminal and the peripheral device operated by the user, based on the access right information associated with the user.

Supplementary Note 48

The program according to any one of Supplementary Notes 40 to 47, wherein the control processing either invalidates an operation on the peripheral device exceeding the access right information of the user or generates warning when detecting such an operation.

Supplementary Note 49

The program according to any one of Supplementary Notes 40 to 48, wherein the peripheral devices include a display device and an input device, and the control processing controls information displayed on a screen of the display device and input from the screen of the display device by the input device, based on the access right information of the user.

Supplementary Note 50

The program according to any one of Supplementary Notes 40 to 49, wherein the authentication processing performs authentication repeatedly at a predetermined time interval.

Supplementary Note 51

The program according to any one of Supplementary Notes 40 to 50, wherein the control processing rewrites device identification information on a control plane so that a plurality of peripheral devices connected to the relay apparatus are seen as a single peripheral device from the information terminal and notifies the information terminal of the device identification information rewritten.

Supplementary Note 52

The program according to any one of Supplementary Notes 40 to 51, wherein, with respect to a plurality of peripheral devices for which the device identification information is rewritten so that the plurality of peripheral devices are seen as a single peripheral device from the information terminal, the control processing notifies the information terminal of device identification information different from the original device identification information when the types of devices constituting the plurality of peripheral devices are different.

Supplementary Note 53

The program according to any one of Supplementary Notes 40 to 52, wherein, when a combination of one or more peripheral devices connected to the relay apparatus is changed, the control processing controls to cause the information terminal to execute device identification processing again after resetting the communication interface to the information terminal.

Supplementary Note 54

A program causing a computer constituting a hub to which a plurality of peripheral devices communicatively connected to an information terminal can be connected and that relays communication between the peripheral devices and the information terminal to execute processing comprising:
authenticating a user using the information terminal by operating the peripheral device; and
controlling relaying of a signal between the peripheral device and the information terminal, based on an authentication result of the user by the authentication means.

Supplementary Note 55

The program according to Supplementary Note 54, wherein the control processing passes or blocks an operation event that the peripheral device transmits/receives to/from the information terminal via a communication interface based on the attribute of the user which is an authentication result in the authentication processing.

Supplementary Note 56

The program according to Supplementary Note 54 or 55, wherein the control processing further passes or blocks an operation event that the peripheral device transmits/receives to/from the information terminal via a communication interface according to a combination of the authentication result, the type of the peripheral device, and the operation event.

Supplementary Note 57

The program according to any one of Supplementary Notes 54 to 56, wherein the control processing stores an operation event between the information terminal and the peripheral device in a storage part.

Supplementary Note 58

The program according to any one of Supplementary Notes 54 to 57 generating an operation event in place of the peripheral device and transmitting the generated operation event to the information terminal based on the authentication result in the authentication processing, or at the output timing of the authentication result in the authentication processing.

Supplementary Note 59

The program according to Supplementary Note 57 or 58, wherein
the authentication processing stores an authentication history of the user in a storage part, and
the control processing extracts operation content performed by the user on the peripheral device by collating the authentication history of the user with a history of the operation events.

Supplementary Note 60

The program according to any one of Supplementary Notes 54 to 59, wherein
the authentication processing identifies access right information associated with the user, based on a result of biometric authentication of the user, and
the control processing controls signal transfer between the information terminal and the peripheral device operated by the user, based on the access right information associated with the user.

Supplementary Note 61

The program according to any one of Supplementary Notes 54 to 60, wherein the control processing either invalidates an operation on the peripheral device exceeding the access right information of the user or generates warning when detecting such an operation.

Supplementary Note 62

The program according to any one of Supplementary Notes 54 to 61, wherein the peripheral devices include a display device and an input device, and the control processing controls information displayed on a screen of the display device and input from the screen of the display device by the input device, based on the access right information of the user.

Supplementary Note 63

The program according to any one of Supplementary Notes 54 to 62, wherein the authentication processing performs authentication repeatedly at a predetermined time interval.

The invention claimed is:
1. An operation authentication relay apparatus connected between an information terminal and a peripheral device communicatively connected to the information terminal,
wherein the operation authentication relay apparatus comprises:
at least a processor;
a memory storing program instructions executable by at least the processor;
a first communication interface to connect to the information terminal;
a second communication interface to connect to the peripheral device; and
a camera,
wherein at least the processor is configured to execute the program instructions to
control the first and second communication interfaces such that the operation authentication relay apparatus is recognized as the peripheral device by the information terminal, and recognized as the information terminal by the peripheral device;

authenticate a user who operates the peripheral device to use the information terminal, by performing face detection of the user in image data captured by the camera and identifying the user from persons with at least face information registered in advance, the information terminal set to be logged in by a shared user account or not equipped with a login function; and control relaying of a signal between the peripheral device and the information terminal, based on an authentication result of the user.

2. The operation authentication relay apparatus according to claim 1, wherein at least the processor is configured to execute the program instructions to pass or block an operation event that the peripheral device transmits to or receives from the information terminal via the operation authentication relay apparatus, based on an attribute of the user which is the authentication result.

3. The operation authentication relay apparatus according to claim 2, wherein at least the processor is configured to execute the program instructions to further pass or block the operation event that the peripheral device transmits to or receives from the information terminal via the operation authentication relay apparatus according to a combination of the authentication result, a type of the peripheral device, and the operation event.

4. The operation authentication relay apparatus according to claim 1, wherein at least the processor is configured to execute the program instructions to store an operation event between the information terminal and the peripheral device in a storage part.

5. The operation authentication relay apparatus according to claim 1, wherein at least the processor is configured to execute the program instructions to generate an operation event in place of the peripheral device and transmit the generated operation event to the information terminal, based on the authentication result, or at an output timing of the authentication result.

6. The operation authentication relay apparatus according to claim 4, wherein at least the processor is configured to execute the program instructions to store an authentication history of the user in a storage part, and extract operation content performed by the user on the peripheral device by collating the authentication history of the user with a history of the operation event.

7. The operation authentication relay apparatus according to claim 1, wherein at least the processor is configured to execute the program instructions to identify access right information associated with the user, based on a result of biometric authentication of the user, and wherein at least the processor is configured to execute the program instructions to control signal transfer between the information terminal and the peripheral device operated by the user, based on the access right information associated with the user.

8. The operation authentication relay apparatus according to claim 1, wherein at least the processor is configured to execute the program instructions to, when detecting an operation on the peripheral device exceeding access right information of the user, perform at least either invalidating the operation or generating warning.

9. The operation authentication relay apparatus according to claim 1, wherein a display device and an input device are each, as the peripheral device, connected to the operation authentication relay apparatus, and wherein at least the processor is configured to execute the program instructions to control information displayed on a screen of the display device and input from the screen of the display device by the input device, based on the access right information of the user.

10. The operation authentication relay apparatus according to claim 1, wherein at least the processor is configured to execute the program instructions to perform authentication repeatedly at a predetermined time interval.

11. The operation authentication relay apparatus according to claim 1, wherein at least the processor is configured to execute the program instructions to rewrite device identification information on a control plane so that a plurality of peripheral devices connected to the operation authentication relay apparatus are seen as a single peripheral device from the information terminal and notify the information terminal of the device identification information rewritten.

12. The operation authentication relay apparatus according to claim 1, wherein at least the processor is configured to execute the program instructions to, with respect to a plurality of peripheral devices for which device identification information is rewritten so that the plurality of peripheral devices are seen as a single peripheral device from the information terminal, notify the information terminal of device identification information different from an original device identification information when a type of a component device constituting the plurality of peripheral devices becomes different.

13. The operation authentication relay apparatus according to claim 1, wherein at least the processor is configured to execute the program instructions to, when a combination of one or more peripheral devices connected to the operation authentication relay apparatus is changed, control to cause the information terminal to execute device identification processing again, after resetting a communication interface to communicate with the information terminal.

14. An operation authentication relay method of an operation authentication relay apparatus connected between an information terminal and a peripheral device communicatively connected to the information terminal and supplying information to the information terminal, the method comprising:

controlling the operation authentication relay apparatus to be recognized as the peripheral device by the information terminal;

controlling the operation authentication relay apparatus to be recognized as an information terminal by the peripheral device;

authenticating a user who operates the peripheral device to use the information terminal, by performing face detection of the user in image data captured by a camera and identifying the user from persons with at least face information registered in advance, the information terminal set to be logged in by a shared user account or not equipped with a login function; and controlling relaying of an operation signal of the peripheral device operated by the user to the information terminal, based on an authentication result of the user.

15. The operation authentication relay method according to claim 14, comprising controlling to pass or block an operation event that the peripheral device transmits to or receives from the information terminal via the operation authentication relay apparatus according to a combination of the authentication result, a type of the peripheral device, and the operation event.

16. The operation authentication relay method according to claim 14, comprising:
generating an operation event in place of the peripheral device; and
transmitting the generated operation event to the information terminal, based on the authentication result, or at an output timing of the authentication result.

17. The operation authentication relay method according to claim 14, comprising:
rewriting device identification information on a control plane so that a plurality of peripheral devices connected to the relay apparatus are seen as a single peripheral device from the information terminal; and
notifying the information terminal of the device identification information rewritten.

18. The operation authentication relay method according to claim 14, comprising
with respect to a plurality of peripheral devices for which device identification information is rewritten so that the plurality of peripheral devices are seen as a single peripheral device from the information terminal,
notifying the information terminal of device identification information different from an original device identification information when a type of a component device constituting the plurality of peripheral devices becomes different.

19. The operation authentication relay method according to claim 14, comprising
when a combination of one or more peripheral devices connected to the relay apparatus is changed,
controlling to cause the information terminal to execute device identification processing again, after resetting a communication interface to communicate with the information terminal.

20. A non-transitory computer readable recording medium storing a program causing a computer constituting an operation authentication relay apparatus connected between an information terminal and a peripheral device communicatively connected to the information terminal and supplying information to the information terminal, to execute processing comprising:
controlling the operation authentication relay apparatus to be recognized as the peripheral device by the information terminal and to be recognized as an information terminal by the peripheral device;
authenticating a user who operates the peripheral device to use the information terminal, by performing face detection of the user in image data captured by a camera connected to the operation authentication relay apparatus and identifying the user from persons with at least face information registered in advance, the information terminal set to be logged in by a shared user account or not equipped with a login function; and
controlling relaying of an operation signal of the peripheral device operated by the user to the information terminal, based on an authentication result of the user.

* * * * *